US009003458B2

(12) United States Patent
Gonder et al.

(10) Patent No.: US 9,003,458 B2
(45) Date of Patent: Apr. 7, 2015

(54) METHOD AND APPARATUS FOR HIGH BANDWIDTH DATA TRANSMISSION IN CONTENT-BASED NETWORKS

(71) Applicant: Time Warner Cable Enterprises LLC, New York, NY (US)

(72) Inventors: Tom Gonder, Broomfield, CO (US); Craig Mahonchak, Superior, CO (US); John Carlucci, Boulder, CO (US); Vipul Patel, Upper Holland, PA (US); John Callahan, Broomfield, CO (US); Jay Thomas, Denver, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

(21) Appl. No.: 14/010,329

(22) Filed: Aug. 26, 2013

(65) Prior Publication Data

US 2014/0059627 A1    Feb. 27, 2014

Related U.S. Application Data

(62) Division of application No. 11/013,665, filed on Dec. 15, 2004, now Pat. No. 8,522,293.

(51) Int. Cl.
*H04N 7/173* (2011.01)
*G06F 15/16* (2006.01)
(Continued)

(52) U.S. Cl.
CPC .... *H04N 21/23614* (2013.01); *H04L 29/06027* (2013.01); *H04L 47/36* (2013.01); *H04N 21/6338* (2013.01); *H04N 21/6375* (2013.01); *H04N 21/6402* (2013.01); *H04N 21/643* (2013.01); *H04L 65/4084* (2013.01);
(Continued)

(58) Field of Classification Search
USPC ............ 725/87, 98, 100, 103, 131, 134, 142, 725/148, 93; 709/227, 228; 717/178
See application file for complete search history.

(56) References Cited

U.S. PATENT DOCUMENTS

| 5,535,206 A | 7/1996 | Bestler et al. |
| 5,625,405 A | 4/1997 | DuLac et al. |
| (Continued) | | |

FOREIGN PATENT DOCUMENTS

| CA | 2376550 | 12/2000 |
| CA | 2438497 | 8/2002 |
| WO | 0160071 | 8/2001 |
| WO | WO 01/10125 | 2/2011 |

OTHER PUBLICATIONS

Motorola Next-Generation CMTS Architecture Protecting Network Investments While Migrating to Next-Generation CMTS Platforms white paper, 10 pages, no date, .Copyrgt. 2004 Motorola, Inc.
(Continued)

*Primary Examiner* — Pinkal R Chokshi
(74) *Attorney, Agent, or Firm* — Gazdzinski & Associates, PC

(57) ABSTRACT

Methods and apparatus for delivering data over extant infrastructure within a content-based network. In one embodiment, the network comprises a cable network, and the infrastructure comprises that nominally used for on-demand (OD) services such as VOD. The method includes the allocation of dedicated end-to-end network resources via a "session request, as well as data flow control and packet size adaptation, by a data server based on feedback from the requesting/receiving client device (e.g., DSTB) within the network. Mechanisms for retransmission requests for error recovery are also provided.

20 Claims, 21 Drawing Sheets

(51) Int. Cl.
  *H04N 21/236* (2011.01)
  *H04L 29/06* (2006.01)
  *H04L 12/805* (2013.01)
  *H04N 21/6338* (2011.01)
  *H04N 21/6375* (2011.01)
  *H04N 21/6402* (2011.01)
  *H04N 21/643* (2011.01)
  *H04L 29/08* (2006.01)
  *H04N 21/222* (2011.01)
  *H04N 21/434* (2011.01)

(52) U.S. Cl.
  CPC ............ *H04L65/607* (2013.01); *H04L 67/14* (2013.01); *H04N 21/2221* (2013.01); *H04N 21/4344* (2013.01)

(56) References Cited

U.S. PATENT DOCUMENTS

| | | |
|---|---|---|
| 5,835,125 A | 11/1998 | Bhagavath |
| 5,841,468 A | 11/1998 | Wright |
| 5,844,897 A | 12/1998 | Asamizuya |
| 5,917,538 A | 6/1999 | Asamizuya |
| 5,940,370 A | 8/1999 | Curtis et al. |
| 5,991,308 A | 11/1999 | Fuhrmann et al. |
| 6,009,098 A | 12/1999 | Asamizuya |
| 6,137,793 A | 10/2000 | Gorman et al. |
| 6,240,401 B1 | 5/2001 | Oren et al. |
| 6,292,624 B1 | 9/2001 | Saib et al. |
| 6,369,840 B1 | 4/2002 | Barnett et al. |
| 6,560,203 B1 | 5/2003 | Beser et al. |
| 6,591,420 B1 | 7/2003 | McPherson et al. |
| 6,622,305 B1 | 9/2003 | Willard |
| 6,760,918 B2 | 7/2004 | Rodriguez et al. |
| 6,772,434 B1 | 8/2004 | Goodwin |
| 6,775,778 B1 | 8/2004 | Laczko et al. |
| 6,792,577 B1 | 9/2004 | Kimoto |
| 6,810,528 B1 | 10/2004 | Chatani |
| 6,817,028 B1 | 11/2004 | Jerding et al. |
| 6,826,267 B2 | 11/2004 | Daum et al. |
| 6,857,132 B1 | 2/2005 | Rakib |
| 6,909,726 B1 | 6/2005 | Sheeran |
| 6,959,288 B1 | 10/2005 | Meding |
| 7,016,376 B1 | 3/2006 | Goldenberg |
| 7,028,009 B2 | 4/2006 | Wang |
| 7,036,012 B2* | 4/2006 | Charrin .................. 713/169 |
| 7,069,577 B2 | 6/2006 | Geile |
| 7,073,193 B2 | 7/2006 | Marsh |
| 7,080,397 B2 | 7/2006 | Cochran et al. |
| 7,124,195 B2 | 10/2006 | Roach |
| 7,136,573 B2 | 11/2006 | Kikuchi et al. |
| 7,146,630 B2 | 12/2006 | Dravida |
| 7,171,485 B2 | 1/2007 | Roach |
| 7,194,001 B2 | 3/2007 | Leatherbury |
| 7,194,009 B2 | 3/2007 | Eng |
| 7,203,311 B1 | 4/2007 | Kahn |
| 7,209,892 B1 | 4/2007 | Galuten |
| 7,213,742 B1 | 5/2007 | Birch |
| 7,216,170 B2 | 5/2007 | Ludvig et al. |
| 7,257,308 B2 | 8/2007 | Plourde |
| 7,263,187 B2 | 8/2007 | Pedlow, Jr. |
| 7,263,188 B2 | 8/2007 | Kohno |
| 7,337,459 B1 | 2/2008 | Tsutsui |
| 7,386,621 B1 | 6/2008 | Hlasny |
| 7,533,376 B2 | 5/2009 | Anwar et al. |
| 7,647,618 B1 | 1/2010 | Hunter et al. |
| 7,774,818 B2* | 8/2010 | Helms et al. .................. 725/95 |
| 7,805,515 B2 | 9/2010 | Riley |
| 7,843,876 B2 | 11/2010 | Holt et al. |
| 7,849,491 B2 | 12/2010 | Perlman |
| 7,878,908 B2 | 2/2011 | Sloate et al. |
| 7,908,626 B2 | 3/2011 | Williamson et al. |
| 7,984,473 B1 | 7/2011 | Casile et al. |
| 8,006,262 B2 | 8/2011 | Rodriguez et al. |
| 8,006,273 B2 | 8/2011 | Rodriguez |
| 8,015,583 B2 | 9/2011 | Bates et al. |
| 8,055,585 B2 | 11/2011 | Wu |
| 8,424,048 B1 | 4/2013 | Lyren et al. |
| 2002/0004870 A1 | 1/2002 | Kobayashi |
| 2002/0042921 A1 | 4/2002 | Ellis |
| 2002/0046406 A1 | 4/2002 | Chelehmal et al. |
| 2002/0059619 A1 | 5/2002 | Lebar |
| 2002/0059635 A1 | 5/2002 | Hoang |
| 2002/0083456 A1 | 6/2002 | Bates et al. |
| 2002/0099642 A1 | 7/2002 | Schwankl et al. |
| 2002/0104019 A1 | 8/2002 | Chatani et al. |
| 2002/0128029 A1* | 9/2002 | Nishikawa et al. ........... 455/517 |
| 2002/0166121 A1 | 11/2002 | Rovira |
| 2002/0196940 A1 | 12/2002 | Isaacson et al. |
| 2003/0005453 A1 | 1/2003 | Rodriguez et al. |
| 2003/0037335 A1 | 2/2003 | Gatto et al. |
| 2003/0049021 A1 | 3/2003 | Kamieniecki |
| 2003/0053476 A1 | 3/2003 | Sorenson et al. |
| 2003/0058887 A1 | 3/2003 | Dworkin et al. |
| 2003/0070052 A1 | 4/2003 | Lai |
| 2003/0093515 A1 | 5/2003 | Kauffman |
| 2003/0093806 A1 | 5/2003 | Dureau et al. |
| 2003/0208768 A1 | 11/2003 | Urdang et al. |
| 2003/0217365 A1 | 11/2003 | Caputo |
| 2003/0229898 A1 | 12/2003 | Babu et al. |
| 2003/0231661 A1 | 12/2003 | DePietro |
| 2004/0025181 A1 | 2/2004 | Addington et al. |
| 2004/0025190 A1 | 2/2004 | McCalla et al. |
| 2004/0123125 A1 | 6/2004 | Zuili |
| 2004/0163129 A1 | 8/2004 | Chapman et al. |
| 2004/0255335 A1 | 12/2004 | Fickle et al. |
| 2004/0264511 A1 | 12/2004 | Futch et al. |
| 2005/0022247 A1 | 1/2005 | Bitran |
| 2005/0038904 A1 | 2/2005 | Dougall |
| 2005/0071882 A1 | 3/2005 | Rodriguez et al. |
| 2005/0091681 A1 | 4/2005 | Borden et al. |
| 2005/0138672 A1* | 6/2005 | Stone .......................... 725/134 |
| 2005/0153778 A1 | 7/2005 | Nelson et al. |
| 2005/0204019 A1 | 9/2005 | Flynn et al. |
| 2005/0251454 A1 | 11/2005 | Wood |
| 2005/0278741 A1 | 12/2005 | Robarts et al. |
| 2005/0278760 A1 | 12/2005 | Dewar et al. |
| 2005/0289618 A1 | 12/2005 | Hardin |
| 2006/0013557 A1 | 1/2006 | Poslinski |
| 2006/0036750 A1 | 2/2006 | Ladd |
| 2006/0047603 A1 | 3/2006 | Fontijn |
| 2006/0089911 A1 | 4/2006 | Dandekar |
| 2006/0130107 A1 | 6/2006 | Gonder |
| 2006/0130113 A1 | 6/2006 | Carlucci |
| 2006/0167808 A1 | 7/2006 | Greene |
| 2006/0173787 A1 | 8/2006 | Weber |
| 2006/0200559 A1 | 9/2006 | Ling et al. |
| 2006/0200865 A1 | 9/2006 | Leake |
| 2006/0206565 A1 | 9/2006 | Ganesan |
| 2006/0294371 A1 | 12/2006 | Fanning |
| 2007/0083899 A1 | 4/2007 | Compton et al. |
| 2007/0107035 A1 | 5/2007 | Howe et al. |
| 2007/0280110 A1 | 12/2007 | Murphy |
| 2009/0235319 A1 | 9/2009 | Mao et al. |
| 2010/0107194 A1 | 4/2010 | McKissick et al. |
| 2010/0146539 A1 | 6/2010 | Hicks et al. |
| 2011/0041146 A1 | 2/2011 | Lewis |

OTHER PUBLICATIONS

Metadata Specifications, CableLabs Asset Distribution Interface Specification, Version 1.1, MD-SP-ADI1.1-104-060505, dated May 5, 2006, 29 pages.
Motorola Next-Generation CMTS Architecture Protecting Network Investments While Migrating to Next-Generation CMTS Platforms white paper, 10 pages, no date, .Copyrgt. 2004 Motorola, Inc.
Arris D5.TM. Universal Edge QAM : http://www.arrisi.com/products/d5/index.asp, .Copyrgt. 1995-2008 Arris Group, Inc., 1 page.

* cited by examiner

©COPYRIGHT 2004 TIME WARNER CABLE, INC. ALL RIGHTS RESERVED.

METHOD AND APPARATUS FOR HIGH BANDWIDTH DATA TRANSMISSION IN CONTENT-BASED NETWORKS

PRIORITY

This application is a divisional of and claims priority to co-owned U.S. patent application Ser. No. 11/013,665 of the same title filed Dec. 15, 2004, and issuing as U.S. Pat. No. 8,522,293 on Aug. 27, 2013, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The invention relates generally to the fields of video and data transmission. In one aspect, the invention relates to the use of a on-demand (e.g., VOD) infrastructure in cable networks for high speed data download to set-top boxes (STBs).

2. Description of Related Technology

The provision of "on-demand" (OD) services, such as e.g., video on-demand or VOD, is well known in the prior art. In a typical configuration, the VOD service makes available to its users a selection of multiple video programs that they can choose from and watch over a network connection with minimum setup delay. At a high level, a VOD system consists of one or more VOD servers that pass and/or store the relevant content; one or more network connections that are used for program selection and program delivery; and customer premises equipment (CPE) to receive, decode and present the video on a display unit. The content is typically distributed to the CPE over a Hybrid Fiber Coaxial (HFC) network.

Depending on the type of content made available and rate structure for viewing, a particular VOD service could be called "subscription video-on-demand (SVOD)" that gives customers on-demand access to the content for a flat monthly fee, "free video-on-demand (FVOD)" that gives customers free on-demand access to some content, "movies on-demand" where VOD content consists of movies only, and so forth. Many of these services, although referred to by names different than VOD, still share many of the same basic attributes including storage, network and decoder technologies.

Just as different varieties of VOD service offerings have evolved over time, several different network architectures have also evolved for deploying these services. These architectures range from fully centralized (e.g., VOD servers at a central location) to fully distributed (e.g., multiple copies of content distributed on VOD servers very close to customer premises), as well as various other network architectures there between. Since most cable television networks today consist of optical fiber towards the "core" of the network which are connected to coaxial cable networks towards the "edge", VOD transmission network architectures also consist of a mixture of optical fiber and coaxial cable portions.

The CPE for VOD often consists of a digital cable set-top box (DSTB) that provides the functions of receiving cable signals by tuning to the appropriate RF channel, processing the received signal and outputting VOD signals for viewing on a display unit. Such a digital set-top box also typically hosts a VOD application that enables user interaction for navigation and selection of VOD menu.

While the architectural details of how video is transported in the core HFC network can be different for each VOD deployment, each generally will have a transition point where the video signals are modulated, upconverted to the appropriate RF channel and sent over the coaxial segment(s) of the network. Depending on the topology of the individual cable plant, this could be performed at a node, hub or a headend. The coaxial cable portion of the network is variously referred to as the "access network" or "edge network" or "last mile network."

In U.S. cable systems for example, downstream RF channels used for transmission of television programs are 6 MHz wide, and occupy a 6 MHz spectral slot between 54 MHz and 860 MHz. Deployments of VOD services have to share this spectrum with already established analog and digital cable television services. For this reason, the exact RF channel used for VOD service may differ from plant to plant. However, within a given cable plant, all homes that are electrically connected to the same cable feed running through a neighborhood will receive the same downstream signal. For the purpose of managing VOD services, these homes are grouped into logical groups typically called Service Groups. Homes belonging to the same Service Group receive their VOD service on the same set of RF channels.

VOD service is typically offered over a given number (e.g., 4) of RF channels from the available spectrum in cable. Thus, a VOD Service Group consists of homes receiving VOD signals over the same 4 RF channels. Reasons for this grouping include (i) that it lends itself to a desirable "symmetry of two" design of products (e.g. Scientific Atlanta's MQAM), and (ii) a simple mapping from incoming Asynchronous Serial Interface (ASI) payload rate of 213 Mbps to four QAM payload rates.

In most cable networks, VOD programs are transmitted using MPEG (e.g., MPEG-2) audio/video compression. Since cable signals are transmitted using Quadrature Amplitude Modulation (QAM) scheme, available payload bitrate for typical modulation rates (QAM-256) used on HFC systems is roughly 38 Mbps. In many VOD deployments, a typical rate of 3.75 Mbps is used to send one video program at resolution and quality equivalent to NTSC broadcast signals. In digital television terminology, this is called Standard Definition (SD) television resolution. Therefore, use of MPEG-2 and QAM modulation enables carriage of 10 SD sessions on one RF channel (10×3.75=37.5 Mbps<38 Mbps). Since a typical Service Group consists of 4 RF channels, 40 simultaneous SD VOD sessions can be accommodated within a Service Group. These numbers work out very well for many deployment scenarios, such as the following example. A typical "service area" neighborhood served by a coaxial cable drop from the cable network consists of 2000 homes, of which about two-thirds are cable subscribers, of which about one-third are digital cable subscribers, of which about 10% peak simultaneous use is expected. Hence, the bandwidth required to meet VOD requirements is 2000×(⅔)×(⅓)× 0.1=approximately 40 peak VOD sessions—the exact number supported by a 4 QAM service group.

Several specific frameworks exist in the prior art for provisioning on-demand (e.g., VOD) and similar services to network subscribers. Notably, in the cable network context, the Interactive Services Architecture (ISA) specification (see, e.g., ISA Versions 1.4 and 1.5) published by the Assignee hereof describes techniques and mechanisms for distributing and delivering movie titles for VOD services. The ISA specification defines functional roles and interfaces that enable the development of pluggable interactive services in a cable environment. The focus of the ISA is primarily on viewer services, which are defined as the set of functions provided by the cable operator to its customers.

While having significant utility, the current ISA specification does not provide a mechanism for the delivery of non-video data such as large binary files, gaming applications, etc., especially at higher speeds which are necessary to maintain the customer's level of satisfaction with the download service.

Demand for High Speed Data

In conventional cable networks (including those compliant with the aforementioned ISA specification), a limited amount of data connectivity is offered between the head-end servers and the CPE (e.g., DSTBs) along with the television programming. Current techniques for sending "user" or non-programming data are intended for low bandwidth applications. Carousel mechanisms, wherein portions of the data are repeated periodically, are commonly used to provide such data services.

Unfortunately, the carousel scheme does not scale well for high bandwidth applications (or applications that require real time data delivery) for a variety of reasons including, e.g., that the CPE rate of data receipt is limited, and if the portions of data are received at the CPE too rapidly, the CPE may miss processing them entirely. This is especially critical for data which cannot sustain even a low level of bit errors (such as application or executable files). This "speed" restriction, coupled with the carousel delivery paradigm itself (i.e., periodic recurrent availability of data), results in comparatively long download times since the CPE has to wait for the next time a data file or portion of interest is transmitted by the data carousel.

Similarly, such conventional approaches lack a scheme wherein the CPE can provide feedback to the sender of such data in order to adjust the delivery speed to match that of the CPE data processing rate (or at least selectively instigate a retransmission of missed data without waiting for the cycle time of the carousel).

These limitations significantly restrict the use of such prior art mechanisms in emerging applications such as video gaming, and in other interactive television applications where a higher rate of download and lower latency of response is required.

Cable modem networks offer high bit-rate connectivity between a headend server and user premises. While such a connectivity solution can provide the bandwidth required for interactive applications, it is typically limited to "PC-centric" environments. Similarly, bandwidth is shared among users of a DOCSIS system; high bit-rate data transfer by each user can impact or adversely affect the bandwidth utilization of other users.

Furthermore, the utilization of VOD bandwidth in content-based networks is known to be non-uniform over time. In a conventional cable network, the unused bandwidth of a VOD channel cannot be used for cable modem data transmission due to the frequency segregation of the services.

A number of other approaches to data delivery (whether downstream or upstream) within a cable network are taught under the prior art. For example, U.S. Pat. No. 5,535,206 to Bestler, et al. issued Jul. 9, 1996 entitled "Upstream data transmission system for cable television" discloses a cable television upstream data transmission system that provides a plurality of time slots synchronized to the downstream symbol clock for use by subscriber terminals in upstream data transmission. The width and number of time slots are controlled by a pair of downloadable values to accommodate dynamic changes of the cable system.

U.S. Pat. No. 5,835,125 to Bhagavath issued Nov. 10, 1998 and entitled "Self-healing configuration for delivering data services on a hybrid fiber-coaxial (HFC) network" discloses the delivery of data services to subscriber clients located in a first access area using a modulated RF carrier signal over an HFC cable network. During times of failure, at least one channel within the roll-off spectrum above the passband of the coaxial amplifiers in the network is used as a protection data channel to supply these data services to the affected subscriber clients via an alternate signal path through an adjoining second access area. The data channel within the passband is upconverted to the roll-off spectrum and transmitted through the adjoining second access area which is interconnected to the first access area through a plurality of protection units. Each protection unit interconnects a side leg within each access area.

U.S. Pat. No. 5,841,468 to Wright issued Nov. 24, 1998 entitled "System and method for routing data messages through a cable transmission system" discloses a system and method for isolating data messages received from subscribers in a CATV system. The system includes a spectrum parallel router which receives data messages in the return spectrum of a service line at a service site. A switch at the service site directs data messages to service lines coupled to the site which have destination addresses corresponding to one of the service lines. Data messages not having a destination address corresponding to one of the service lines are provided to a transmitter for transmission to the next higher level of the CATV network over a return cable. Each service site has its own return cable which may be coupled to a distribution hub or a headend.

U.S. Pat. No. 5,991,308 to Fuhrmann, et al. issued Nov. 23, 1999 entitled "Lower overhead method for data transmission using ATM and SCDMA over hybrid fiber coax cable plant" discloses a process for reducing the amount of overhead data in ATM cell headers prior to transmission both upstream and downstream on an HFC cable plant using SCDMA on at least the upstream path, without loss of either IP or Ethernet addressing information. Downstream ATM cells are optimized by stripping off all but 2 bytes to leave a 50 byte cell. Incoming IP packets have their IP addressing information used to look up Ethernet domain address information. An Ethernet header is appended to each IP packet as is RFC 1483 bytes to signal the start of the packet. The packet is parsed into 48 byte ATM cell payloads.

U.S. Pat. No. 6,137,793 to Gorman, et al. issued Oct. 24, 2000 entitled "Reverse path multiplexer for use in high speed data transmissions" discloses a two-way hybrid fiber-coax cable network offering high-speed broadband communications delivered via a cable modem service. Bi-directional transmissions of packets between the head-end controller (Cable Modem Terminal System) and cable modems (subscriber terminal units) is accomplished using a cable television Media Access Control (MAC) protocol. In Hybrid Fiber-Coax (HFC) networks, the invention provides a Reverse Path Multiplexing (RPM) function permitting the coupling of a large number of return path (plant) RF ports (return ports) to be coupled to a receiver card in the CMTS.

U.S. Pat. No. 6,560,203 to Beser, et al. issued May 6, 2003 entitled "Method for changing type-of-service in a data-over-cable system" discloses a method and system for changing type-of-service in a data-over-cable system. The method and system allow a cable modem or a cable modem termination system to dynamically override the statically assigned typeof-service supplied to the cable modem in a Dynamic Host Configuration Protocol ("DHCP") initialization sequence. A selection input can request a second type-of-service that may or may not be supported by the cable modem on the cable modem termination system. If the requested second type-of-service with an associated second quality-of-service is permitted on the cable modem, the cable modem termination system dynamically changes the first type-of-service to the requested second type-of-service.

United States Patent Publication No. 20020046406 to Chelehmal, et al. published Apr. 18, 2002 entitled "On-demand data system" discloses a system for allowing on-demand delivery of data, such as MPEG-2 compressed video data, to a subscriber from a content server. The system utilizes a managed IP network that is coupled to the one or more content servers that allows the content servers to deliver data such as video, audio, and textual data with a guaranteed quality of service that is at least as good as broadcast quality service. The managed IP network is connected to a head end or other local cable service provider where video is delivered locally to subscribers. The IP transport data is translated to MPEG transport data, multiplexed onto an MPEG transport system, digitally modulated onto an RF carrier and up-converted to a specific frequency channel. The signal is then applied to the cable for delivery to the subscriber. Upstream signaling occurs through a set top box or computer that is connected to the cable and subsequently to a digital modulator/demodulator and ISP to a managed IP network. Low band signals can also be transmitted from the content servers back to the set top box or computer indicating confirmation of an order. Also, control signals such as stop, rewind, fast-forward, and slow can be transmitted back to the content server to control the transmission of data from the content server to the subscriber.

United States Patent Publication No. 20020059635 to Hoang published May 16, 2002 entitled "Digital data-on-demand broadcast cable modem termination system" discloses methods and systems (including a cable modem termination system (CMTS)) for enabling a data-on-demand (DOD) digital broadcast system to provide digital DOD services via a communications medium over one or more channels. The cable modem termination system comprises: a communications network interface for receiving at least one DOD service from the DOD digital broadcast system, wherein the DOD service is formatted as a stream of data blocks arranged in a schedule such that a first data block of the DOD service may be accessed at any selected time period; a unidirectional network interface for providing the stream of data blocks to a plurality of users, wherein the users may access the first data block at any time period and may access subsequent data blocks of the stream of data blocks thereby accessing the at least one DOD service.

United States Patent Publication No. 20030058887 to Dworkin, et al. published Mar. 27, 2003 entitled "Method and apparatus for interleaving DOCSIS data with an MPEG video stream" discloses a cable modem system and method for interleaving MPEG video data frames with DOCSIS data frames. A cable modem system in accordance with the invention includes a cable modem termination system (CMTS) that is adapted to detect the presence of null packets in an MPEG video data stream and insert DOCSIS data frames in there place. The source of the MPEG video data stream determines the clock rate at which the MPEG data stream is routed through the CMTS.

While the foregoing citations illustrate a broad variety of different prior art data transmission techniques, all such techniques generally suffer from one or more of the following disabilities: (i) requiring significant modifications or upgrades to existing cable system infrastructure and associated standards; (ii) not providing sufficiently high data download rates along with low service latency; and/or (iii) not providing mechanisms for control of the data stream via the CPE (including error correction, retransmission, and pause/restart capability).

Based on the foregoing discussion, it is evident that improved apparatus and methods are needed to provide high-speed data connectivity between two nodes on a content-based network, e.g., the cable system head-end and the CPE. Such apparatus methods would ideally be able to utilize available bandwidth from the OD (e.g., VOD) spectrum, and also use the existing OD infrastructure. It would further be advantageous if such data apparatus and methods could be added to a network without requiring significant modifications to system hardware (e.g., servers and CPE), which tends to impede the implementation of new services and increase the cost of such implementation.

SUMMARY OF THE INVENTION

The present invention addresses the foregoing needs by providing improved methods and apparatus for data transmission within content-based networks such as cable and satellite networks.

In a first aspect of the invention, a method of delivering data over a cable network is disclosed. In one embodiment, the method comprises: delivering a data structure to a first network entity; converting data contained within the structure into a packet stream; creating a descriptive structure to describe the data; and transmitting the descriptive structure and packet stream over the network via a session established between the first network entity and a second network entity.

In a second aspect of the invention, a method of providing high-speed data delivery over a cable network using substantially existing infrastructure is disclosed. In one embodiment, the method comprises: delivering a data structure to a distribution entity of the network; processing data contained within the structure into a packet stream; creating a descriptive structure relating to the data; establishing a substantially dedicated session and transmission pathway from the distribution entity to a client device of the cable network using the existing infrastructure; and transmitting the descriptive structure and packet stream over the dedicated pathway as part of the session.

In a third aspect of the invention, improved CPE adapted for use in a cable network is disclosed. In one embodiment, the CPE is adapted to receive high-speed non-content data downloads, and comprises: a processor; and at least one computer program operative to run on the processor and configured to: initiate a session request upstream to a remote network entity; receive information from the network to establish the session and a dedicated communication channel; and receive non-content related data over the channel.

In a fourth aspect of the invention, a method of processing data for delivery over a cable network is disclosed. In one embodiment, the method comprises: receiving data files conforming to an interface specification (such as the ISA Specification) at one or more network servers; converting raw data stored in one or more of the files into a packet stream; creating at least one descriptive metadata file to describe at least portions of the raw data; creating at least one software package that includes the packet stream and the descriptive metadata; and creating at least one catalog entry to indicate the availability of the data to a client device.

In a fifth aspect of the invention, a method of operating CPE used in a cable network is disclosed. In one embodiment, the CPE is configured to initiate a session request upstream to a remote network entity, receive information from the network to establish the session and a dedicated communication channel, and receive non-content related data over the channel, and the method comprises: receiving data other than the non-content data, yet relating thereto, from the network; using the other data to service at least one catalogue function; and based at least in part on user inputs received by the CPE relating to the catalogue function, selecting the non-content data for download.

In a sixth aspect of the invention, a method of providing gaming-related data over a cable network is disclosed. In one embodiment, the method comprises: receiving a request from a user to download the gaming-related data; initiating a session request upstream to a remote network entity; receiving information from the network to establish the session and a dedicated communication channel; and receiving the gaming-related data over the channel as part of an in-band transport stream.

In a seventh aspect of the invention, a method of providing non-content data over a cable network in a non-continuous fashion is disclosed. In one embodiment, the method comprises: receiving a request from a user to download the data; initiating a session request upstream to a remote network entity; receiving information from the network to establish the session and a dedicated communication channel; receiving a first portion of the data over the channel as part of an in-band transport stream; issuing a request to pause the delivery of the data; pausing the delivery of data for at least a period of time; and subsequently receiving a second portion of the data over the channel.

In an eighth aspect of the invention, a method of sending at least one data structure over a cable network using on-demand network infrastructure is disclosed. In one embodiment, the method comprises: receiving a user request to download the data structure, the user request substantially comprising an on-demand session request; establishing the session and a dedicated communication channel in response to the request; disposing at least portions of the data structure within MPEG packets; and transmitting the MPEG packets over the channel as part of an in-band transport stream.

In a ninth aspect of the invention, a method of sending at least one data structure over a cable network using on-demand network infrastructure is disclosed. In one embodiment, the data structure is sent in a time-shifted multiplex according to the method comprising: receiving a user request to download the data structure, the user request substantially comprising an on-demand session request; establishing the session and a dedicated communication channel in response to the request; disposing at least portions of the data structure within packets; and transmitting multiple time-shifted copies of the packets over the channel as part of an in-band transport stream.

In a tenth aspect of the invention, a method of transferring a first data structure over a cable network in the form of second data structures is disclosed. In one embodiment, the first data structure comprises a binary data file, and the second structures comprise MPEG packets. The cable network is specifically configured to process the MPEG packets contained within a transport stream, and the method comprises: receiving a user request to download the first data structure; establishing a dedicated communication channel in response to the request; disposing at least portions of the first data structure within a plurality of the second data structures; transmitting the second data structures over the channel as part of the transport stream; and processing the second data structures within the transport stream, the processing substantially reproducing the first data structure.

In an eleventh aspect of the invention, an improved network server adapted for high-speed data download service is disclosed. In one embodiment, the server comprises: a digital processor; a storage device in data communication with the processor; a first interface adapted to receive data in a first form from at least one data source; a computer program running on the processor and adapted to process the data in the first form to create a plurality of data structures of a second form; and a second interface adapted to transmit the plurality of data structures onto a network for subsequent delivery to a distant entity. The computer program is further adapted to: receive a session request from the distant entity; and, in response to the request: establish a session for the delivery of the data structures; allocate at least one physical channel to the delivery; and transmit information to the distant entity regarding at least the physical channel.

In a twelfth aspect, an improved on-demand server apparatus for providing data over a content delivery network is disclosed. In one embodiment, the server comprises an interface for communication with at least one client device; and a processor configured to run at least one computer program thereon, the computer program comprising a plurality of instructions which are configured to, when executed, causes the server to: receive at least one non-content related data structure at a head-end distribution server from at least one data source; process data contained within the non-content related data structure into an MPEG packet stream; create a descriptive structure describing the non-content related data structure; establish a dedicated on-demand session on an in-band downstream transmission pathway from the head-end distribution server to the at least one client device based on a request received from software operating on the at least one client device; and transmit one or more time-shifted copies of the non-content related data structure over the in-band downstream transmission pathway within a multiplexed transport stream and as part of the dedicated on-demand session.

In a thirteenth aspect, an improved method of providing non-content related data to a plurality of consumer premises equipment (CPE) over a cable network is disclosed. In one embodiment, the method comprises: receiving a request to download the non-content related data from at least one CPE, the request comprising an on-demand session request; establishing the on-demand session request on at least one dedicated communication channel in response to the request; disposing at least portions of the non-content related data within MPEG packets; generating descriptive metadata indicating the non-content related data of the MPEG packets, the descriptive metadata being used by at least a portion of the on-demand network infrastructure to process the MPEG packets differently than other packets processed by the infrastructure; delivering at least a first portion of the MPEG packets and the descriptive data over the at least one dedicated communication channel as part of an in-band transport stream to the at least one CPE; issuing a request to pause the delivery of the MPEG packets and the descriptive data; pausing the delivery of the MPEG packets and the descriptive data for at least a period of time; and subsequently delivering at least a second portion of the MPEG packets and the descriptive data over the at least one dedicated communication channel to the at least one CPE.

In a fourteenth aspect, an improved CPE adapted for use in a cable network is disclosed. In one embodiment, the CPE comprises a processor; and at least one computer program operative to run on the processor, the computer program comprising a plurality of instructions which are configured to, when executed, cause the CPE to: initiate a session request upstream to a remote network entity for at least one non-content related data structure; receive information from the network to establish the session on a dedicated communication channel; and receive the at least one non-content related data structure over the dedicated communication channel via the session, the at least one non-content related data structure comprising raw data converted to at least one MPEG packet stream and descriptive metadata describing the raw data for transmission to the CPE; terminate the session upon receipt of an indicator configured to indicate receipt of all of the MPEG packet stream and the descriptive metadata; and reassemble the transmitted MPEG packet stream using the descriptive metadata into the at least one non-content related data structure, the reassembling being triggered in part on the indicator; wherein the at least one reassembled non-content related data structure is executable by the CPE without requiring a session to be established with an on-demand server.

DETAILED DESCRIPTION OF THE INVENTION

Figure 1:
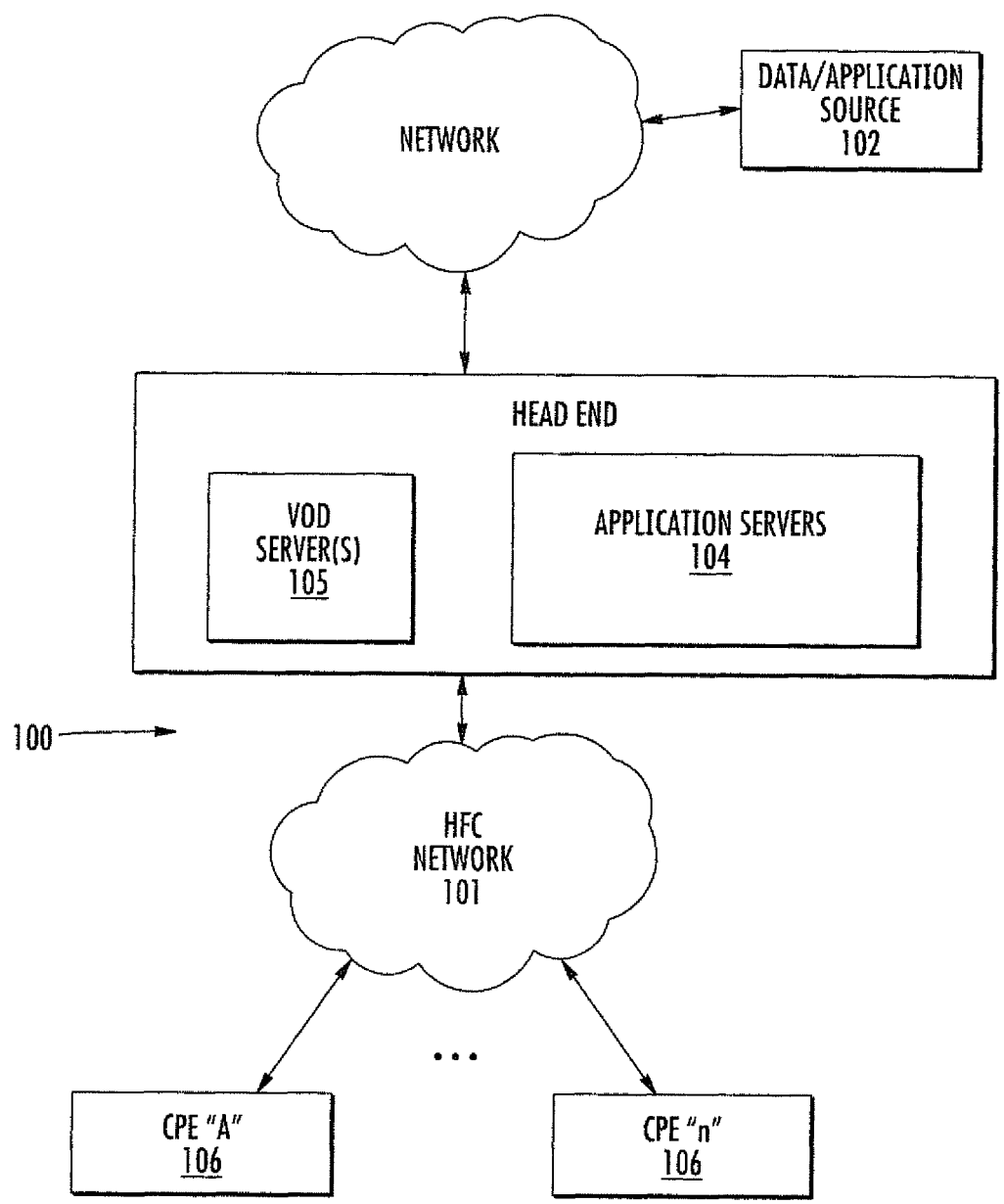
FIG. 1 is a functional block diagram illustrating an exemplary HFC network configuration useful with the present invention.

Reference is now made to the drawings wherein like numerals refer to like parts throughout.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "head-end" refers generally to a networked system controlled by an operator (e.g., an MSO or multiple-systems operator) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that customers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the terms "client device" and "end user device" include, but are not limited to, personal computers (PCs) and minicomputers, whether desktop, laptop, or otherwise, set-top boxes such as the Motorola DCT2XXX/5XXX and Scientific Atlanta Explorer 2XXX/3XXX/4XXX/8XXX series digital devices, personal digital assistants (PDAs) such as the Apple Newton®, "Palm®" family of devices, handheld computers, personal communicators such as the Motorola Accompli or MPx 220 devices, J2ME equipped devices, cellular telephones, or literally any other device capable of interchanging data with a network.

Similarly, the terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes, televisions, Digital Video Recorders (DVR), gateway storage devices (Furnace), and ITV Personal Computers.

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

As used herein, the term "ISA" refers to any of the existing or future variants of the Interactive Services Architecture Specification or related specifications, including without limitation ISA versions 1.4 and 1.5, each incorporated herein by reference in its entirety.

The term "processor" is meant to include any integrated circuit or other electronic device (or collection of devices) capable of performing an operation on at least one instruction including, without limitation, reduced instruction set core (RISC) processors, CISC microprocessors, microcontroller units (MCUs), CISC-based central processing units (CPUs), and digital signal processors (DSPs). The hardware of such devices may be integrated onto a single substrate (e.g., silicon "die"), or distributed among two or more substrates. Furthermore, various functional aspects of the processor may be implemented solely as software or firmware associated with the processor.

As used herein, the term "package" refers to an arrangement of computer-readable data files or other data structures assembled to comply with a specific syntax or protocol.

As used herein, the term "provisioning" refers generally to a process whereby a package, content title or other information is provided to a service (such as on-demand download service) so that the information is integrated with other functions and software modules within the service.

As used herein, the terms "computer program", "routine," and "subroutine" are substantially synonymous, with "computer program" being used typically (but not exclusively) to describe collections or groups of the latter two elements. Such programs and routines/subroutines may be rendered in any language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose.

Overview

The present invention provides, inter alia, apparatus and methods for downloading data (such as large binary objects or files) at accelerated rates over a communication channel within a network. In one embodiment, the network comprises a cable television network, and data delivery is accomplished via a "point-to-point" approach wherein a session is established between the receiving entity (such as a DSTB) and the distributing entity (e.g., an OD server) using one or more allocated QAMs, and a program identifier. Session establishment and data flow control are advantageously implemented using protocols and bandwidth that are typically used for delivery and control of video-on-demand (VOD) or similar services, thereby obviating any substantive modifications to the existing network infrastructure. Sessions can be established for the data transfer, and then immediately terminated when the transfer is completed, thereby rapidly freeing up bandwidth on the network as with a conventional OD session.

In one variant, the data is compliant with the Interactive Services Architecture (ISA) specification, and is disposed within MPEG transport packets such that the data appears (and advantageously can be handled) much as any other MPEG transport stream. The exemplary client application receiving the MPEG packets checks the packets for integrity, manages flow control, and reassembles the packets at the client device to provide the user with data in its original form. A catalog entry is created for the data structure(s) so that the DSTB or other downstream device can be made aware of the availability of the data. This functionality can be accomplished using, e.g., a navigator application implemented within the DSTB.

Applications where the accelerated data download capability of the present invention may be especially useful include downloading large binary executable files for software applications or games, downloading the results of network-based content searches or database queries, distributing data or files related to interactive television or television-based commerce, or any other use that requires significant volumes of data be delivered quickly and efficiently over the network.

The data download methods of the invention are also completely agnostic to the type of payload data being transmitted, thereby allowing the transfer of literally any type of data or files over the network.

Detailed Description of Exemplary Embodiments

Exemplary embodiments of the apparatus and methods of the present invention are now described in detail. While these exemplary embodiments are described in the context of the aforementioned hybrid fiber coax (HFC) cable system architecture having an multi-systems operator (MSO), digital networking capability, and plurality of client devices/CPE, the general principles and advantages of the invention may be extended to other types of networks and architectures, whether broadband, narrowband, wired or wireless, or otherwise, the following therefore being merely exemplary in nature. For example, these techniques can be employed in the context of a broadband satellite network.

It will also be appreciated that while described generally in the context of a network providing service to a customer (i.e., home) end user domain, the present invention may be readily adapted to other types of environments including, e.g., commercial/enterprise, and government/military applications. Myriad other applications are possible.

System Architecture

FIG. 1 illustrates a typical content-based network configuration with which the high-bandwidth data services apparatus and methodology of the present invention may be used. The various components of the network 100 include (i) one or more data and application origination points 102; (ii) one or more application distribution servers 104; (iii) one or more VOD servers 105, and (iv) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the head-end architecture of FIG. 1a (described in greater detail below) may be used.

The application origination point 102 comprises any medium that allows an application (such as a data download application or VOD-based application) to be transferred to a distribution server 104. This can include for example an application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 a computer system where on-demand content, as well as the data discussed in greater detail below) can be received from one or more data sources 102 and enter the network system. These sources may generate the content/data locally, or alternatively act as a gateway or intermediary from a distant source. The VOD server 105 includes the Session Resource Manager (SRM) functionality, and asks the Digital Network Control System (DNCS) for resources. The DNCS responds with negative or positive response to the request, and the VOD server implements the appropriate resource allocation logic.

The CPE 106 includes any equipment in the "customers' premises" (or other locations, whether local or remote to the distribution server 104) that can be accessed by a distribution server 104. Such CPEs 106 comprise processors and associated computer memory (and optionally mass storage) adapted to store and run the downloaded or resident application, as well as receive and store the streamed in-band content and data. In the present context, at least a portion of the CPE application necessary to facilitate high-speed data download can itself be downloaded to the CPE 106, wherein the latter executes the downloaded application(s)/components in order to enable the CPE to receive the high-speed data, although it will be recognized that the application(s) may also be resident on the CPE before download, received from another source (such as a third party Internet site, CD-ROM, etc.).

Figure 1A:
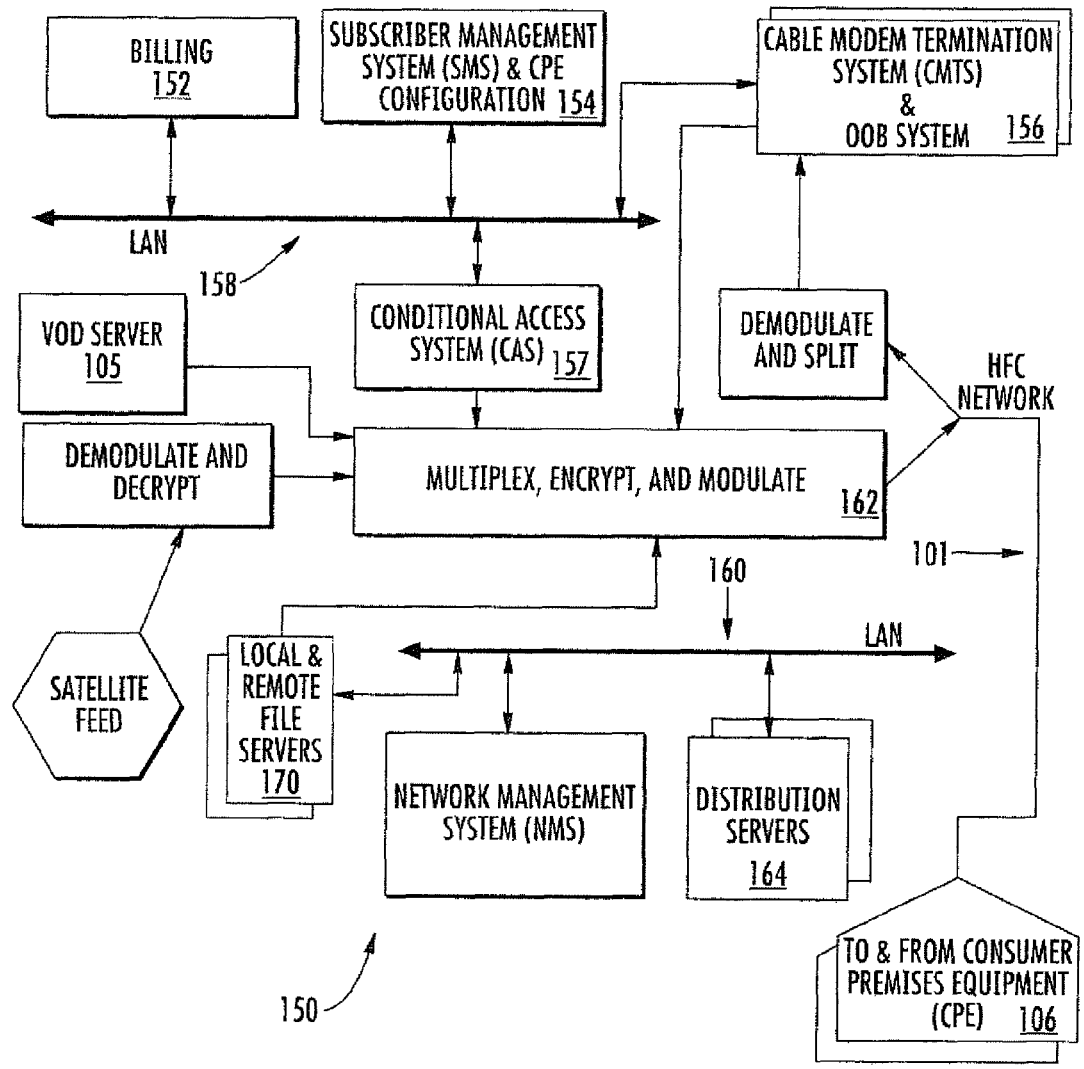
FIG. 1a is a functional block diagram illustrating one exemplary head-end configuration of the HFC network of FIG. 1.

Referring now to FIG. 1*a*, one exemplary embodiment of a head-end architecture useful with the present invention is described. As shown in FIG. 1*a*, the head-end architecture 150 comprises typical head-end components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 1*a* is high-level, conceptual architecture and that each MSO may have multiple head-ends deployed using custom architectures.

The architecture 150 of FIG. 1*a* further includes a multiplexer/encrypter/modulator (MEM) 162 coupled to the HFC network 101 adapted to "condition" content for transmission over the network. In the present context, the distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the head-end must be adapted to acquire the information for the carried channels from various sources. Typically, the channels being delivered from the head-end 150 to the CPE 106 ("downstream") are multiplexed together in the head-end and sent to neighborhood hubs (not shown).

Content (e.g., audio, video, etc.) is provided in each downstream (in-band) channel associated with the relevant service group. As will be discussed in greater detail subsequently herein, high-speed data is also provided over in-band channels, while associated metadata files are provided either in-band or out-of-band (OOB). To communicate with the head-end, the CPE 106 uses the OOB or DOCSIS channels and associated protocols. The OCAP 1.0 specification provides for networking protocols both downstream and upstream.

It will also be recognized that the multiple servers (OD or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups. One exemplary multi-server architecture particularly useful with the present invention is described in co-pending and co-owned United States Patent Application Publication No. 20020059619 to Lebar published May 16, 2002 and entitled "Hybrid central/distributed VOD system with tiered content structure" which is incorporated herein by reference in its entirety.

Specifically, a hybrid central/distributed and tiered video on demand (VOD) service network with tiered content structure is disclosed. In particular, the system uses media servers located in both the head-end and hub stations. Set-top boxes generally would be supplied VOD services from the high-demand content media (and data) servers located in the hub station nearest to the user. The central media server located in the head-end would be used as an installed backup to the hub media servers; as the primary source for lower demand VOD services and as the source of the real time, centrally encoded programs with PVR (personal video recorder) capabilities. By distributing the servers to the hub stations, the size of the fiber transport network associated with delivering VOD services from the central head-end media server is reduced. Hence, each user has access to several server ports located on at least two servers. Multiple paths and channels are available for content and data distribution to each user, assuring high system reliability and enhanced asset availability. Substantial cost benefits are derived from the reduced need for a large content distribution network and the reduced storage capacity requirements for hub servers.

Many other permutations of the foregoing system components and communication methods may also be used consistent with the present invention, as will be recognized by those of ordinary skill in the field.

Methods

Figure 2:
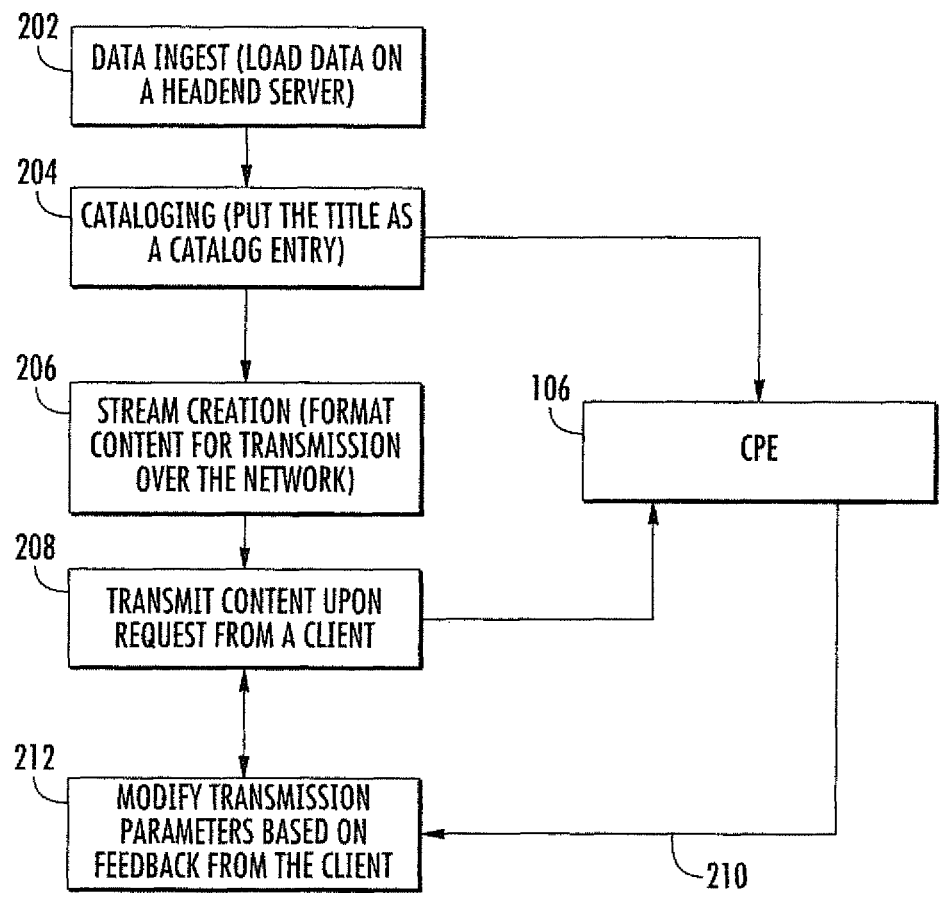
FIG. 2 is a logical flow diagram illustrating one embodiment of the generalized methodology of transmitting a non-content data stream over a network according to the invention.

Referring now to FIG. 2, one exemplary generalized methodology of providing high-speed data services over a network is described. It will be recognized that the steps shown in the embodiment of FIG. 2 are high-level logical steps applicable to literally any cable on-demand (e.g., VOD) architecture, and are not intended to require or imply any specific process flow that may occur within particular implementations of the method. In practical embodiments, some of these steps (or sub-steps within each step) may be implemented in parallel, on different hardware platforms or software environments, performed iteratively, and so forth.

In the first step 202 of the method 200, data in the form of, e.g., one or more data files or structures is brought onto or "ingested" a head-end server, such as by executing the appropriate communication protocol between the source of data and a head-end server. Such ingestion of data and the supporting protocols to accomplish this function are well known in the art, and accordingly not described further herein. As used herein, the terms "data files" and "data structures" refer generally to literally any organized form or assembly of binary or other data such as, without limitation, binary executable files, graphics or audio files (compressed or otherwise), encryption-related files, "zipped" files, video files (e.g., AVIs or MPEGs), etc.

Next, a catalog entry is optionally created for the loaded data file(s) per step 204. This action is performed so that user CPE 106 can be made aware of the availability of the data file(s). This can be accomplished via, e.g., a navigator application implemented on the CPE 106, or some other user interface (UI) mechanism including on-screen alerts, audible signals, periodic or regularly scheduled status functions, etc.

Per step 206, the data file(s) or other structures is/are processed into a format or protocol suitable for transmission over the cable network ("stream formation"). For example, the data maybe formatted according to the well-known MPEG (e.g., MPEG2) packet data format such that the resulting data packets are effectively indistinguishable to the network infrastructure from other (i.e., content) packets.

It will be appreciated that in various embodiments, the cataloging and stream formation processes (steps 204, 206 respectively) may be implemented concurrently, serially, or in another implementation-specific order as required.

When the CPE 106 requests delivery of the data stream, a downstream data flow is established (typically involving allocation of server, network and client resources) per step 208. Based on optional feedback obtained (step 210) from the CPE 106 receiving the data stream, some characteristics of the stream (e.g. transmission rate, multiplexing parameters, etc.) may be modified, and/or re-transmissions of the data may take place in order to overcome any transmission errors (step 212).

According to one exemplary protocol, the data transmission is conducted, and the software process at the head-end server (or other transmitting location) also monitors retransmission requests to evaluate their frequency, etc. in order to determine a transmission "efficiency". For example, if transmission of a given data file at Rate A results in requests that 50% of the transmitted packets be re-transmitted (50% efficiency), then the server software process may reduce the rate by a predetermined or dynamically determined amount, to Rate B (B<A), measure efficiency, and adjust again if needed. Similarly, where Rate A produces no errors (100% efficiency), the rate can be incrementally increased until efficiency begins to drop, or another criterion (such as maximum channel rate) is reached.

The foregoing steps are now described in detail with reference to FIGS. 2a-2c. It will be appreciated that while the exemplary method is described below primarily in the context of various logical or functional software processes or entities (which may include for example software objects), aspects of the invention may be realized in other forms as well, including hardware or firmware, or combinations of the foregoing.

Data Ingestion and Package Creation—

As used herein, the term "ingestion" refers generally to the process by which a data file or other structure is transferred or loaded onto another entity, such as for example a head-end server. This ingestion may be accomplished by using appropriate interfaces for the data (and any associated metadata or other data structures).

The details or particular implementation of the syntax used for the ingestion process of FIG. 2 may be maintained consistent, or alternatively vary, from network to network. For example, in cable networks that implement the aforementioned ISA architecture, such data transfer is performed in accordance with the CableLabs® Asset Distribution Interface (ADI) Specification, Version 1.1, MD-SP-ADI1.1-I03-040107, dated Jan. 7, 2004, although it will be appreciated that compliance with this specification is not a requirement in practicing the broader invention disclosed herein. For such ADI-compliant cable networks, the ingestion process relies on valid Asset Distribution Interface (ADI)-compliant files, and a predetermined sequence of steps as defined by the ISA specification. ADI files minimally contain the ADI.XML, ADI.DTD, and any MPEG transport files contained with the ADI.XML file.

When performing ingestion of data files in an existing VOD deployment, the steps taken under the exemplary embodiment of the invention are purposely selected to closely match the steps taken for corresponding VOD content ingestion, with the exception of adding/substituting data fields to indicate to the servers or other processing/distribution entities that the particular file being loaded is a data type (as opposed to content). These data fields are used by the head-end server (s) for a variety of functions including, e.g., to turn off or temporarily disable "trick mode" support (i.e., fast forward, rewind, or other PVR functions) for the data files, since such support is not desired or necessary. They may also be used by the CPE 106 to alert the CPE that the packets (e.g., MPEG packets) within which the data is encapsulated are data versus content-related.

It will be recognized however that these data fields, or others included in the protocol, may also be used to turn on or enable functionality particular to, or which is to be selectively applied to, the data files if desired, such as e.g., additional encryption, error correction, coding, signal processing, compression/decompression, etc.

Figure 2A:
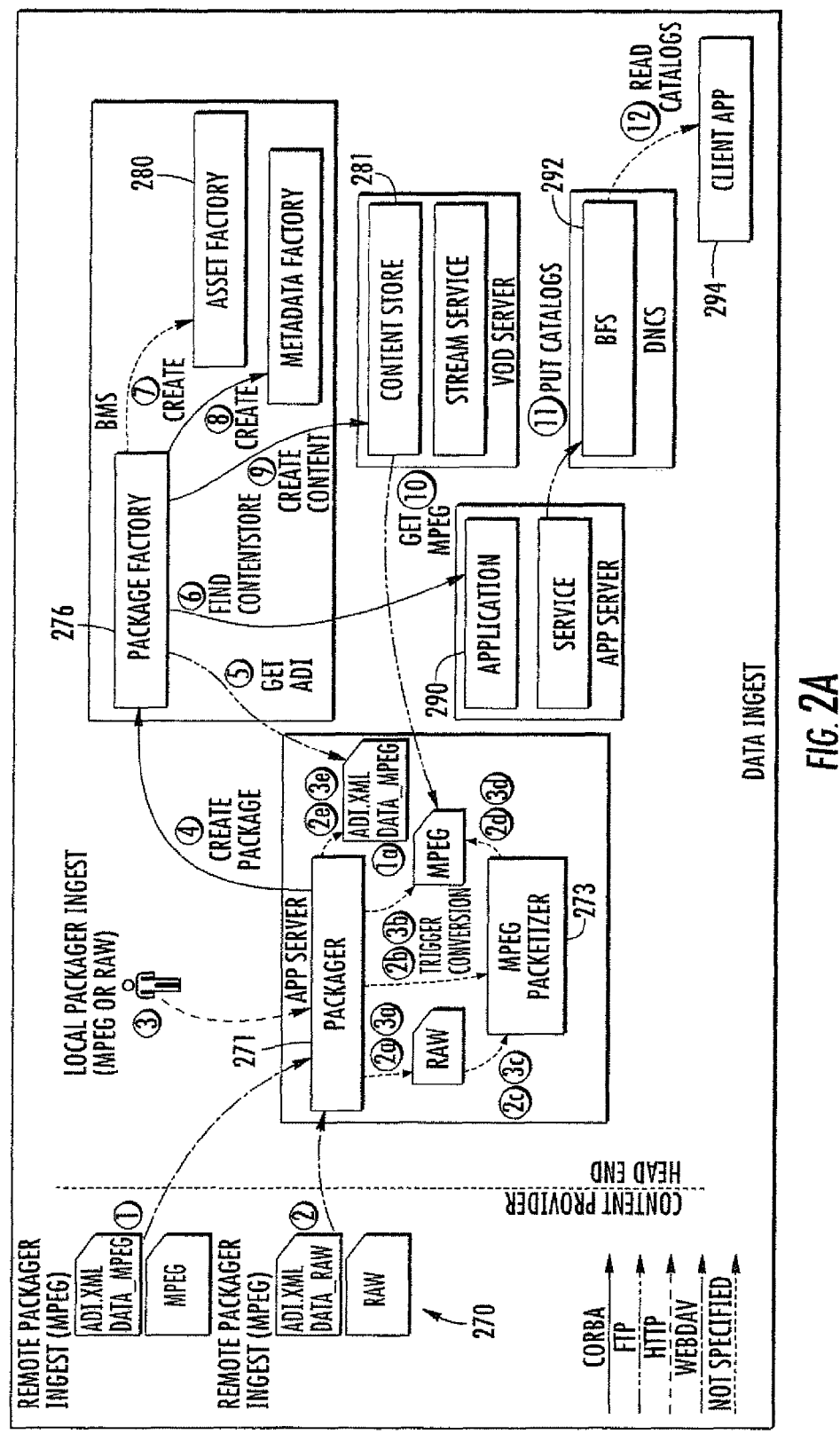
FIG. 2a is a graphical representation of an exemplary embodiment of the session and data stream establishment process, and the various entities utilized therein, according to the invention.
Figure 2B:
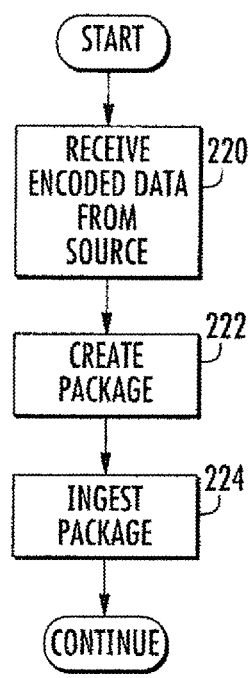
FIG. 2b is a logical flow diagram illustrating one embodiment of the method of ingesting packetized (e.g., MPEG-encoded) data at a server from a remote packaging source according to the invention.

FIG. 2a graphically illustrates an exemplary series of steps taken in performing the creation of a data "package", as well as subsequent data ingestion (step 202 of FIG. 2), within a cable network implementing the ISA specification. As described in greater detail below, the sources of data for the ingestion process may be, e.g., either (i) remote (i.e., coming across the interface between a content provider or other third-party source and a cable head-end; see FIGS. 2b and 2c and their supporting discussion), or (ii) local (i.e., created locally within the head-end, data infrastructure, or associated components; see FIG. 2d). It will be recognized that the terms "local" and "remote" as used in the present context are arbitrary and relative in nature, and do not connote any particular location, proximity, relationship or the like.

It will also be recognized that while the following description of the exemplary embodiments are rendered in terms of an object-oriented software environment (including various software objects and entities), other paradigms and architectures may be used consistent with the invention. For example, one or more aspects of the described functionality may be implemented in anon-object oriented environment, and/or in firmware or hardware as desired. Hence, the following discussion is merely illustrative of the broader principles.

For enabling remote package ingestion of MPEG data (see FIGS. 2a and 2b), a content provider first receives the raw data (step 220), then creates an ADI-complaint package 270 including the ADI.XML, ADI.DTD, and data MPEG file(s)

per step 222. For MPEG data, the metadata Type value is set to "data_mpeg" to indicate that the content file comprises valid MPEG sections encoded according to the relevant data encoding specification.

The created package 270 is then ingested into the system using the Packager entity 271 (step 224). In the illustrated embodiment, receipt of the complete ADI package 270 triggers the ingestion of data into the system. An exemplary implementation of the interface used for this ingestion comprises one based on the Web-based Distributed Authoring and Versioning (WebDAV) method, although it will be appreciated that other paradigms may be used. As is well known, WebDAV is a set of extensions to the HTTP protocol which allows users to collaboratively edit and manage files on, e.g., remote servers.

Figure 2C:
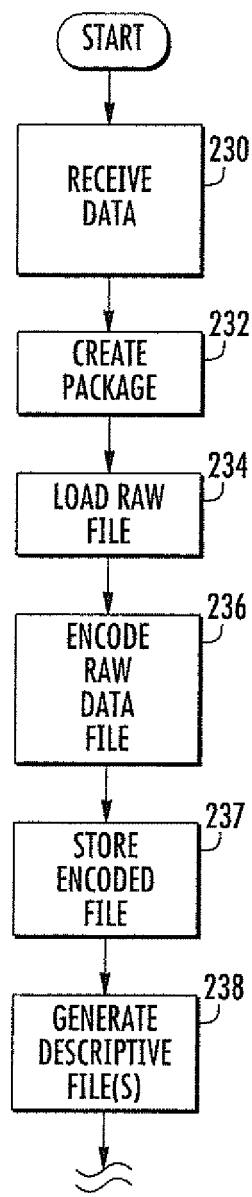
FIG. 2c is a logical flow diagram illustrating one embodiment of the method of ingesting raw data from a remote packaging source according to the invention.

Referring now to FIGS. 2a and 2c, one exemplary method for ingestion of raw remote data is described. Per steps 230 and 232, the content provider receives the raw data and creates an ADI-compliant package including the ADI.XML, ADI.DTD, and the raw data file. The metadata for Type is set to "data_raw" to indicate that the content file requires MPEG packetization.

In step 234, the raw content file is loaded onto the file system of the Packager entity 271.

The Packager 271 user interface (UI) is optionally used by the operator to specify that the file requires encoding, and the MPEG packetizer 273 is triggered to convert the file(s) into an MPEG single program transport stream (SPTS). The raw file is then converted into MPEG format by the MPEG packetizer 273 (step 236) using any number of different techniques well known in the art. The converted MPEG file is stored on the Packager entity file system (step 237).

Lastly, in step 238, the Packager entity 271 produces an ADI.XML and an ADI.DTD file describing the new package.

Figure 2D:
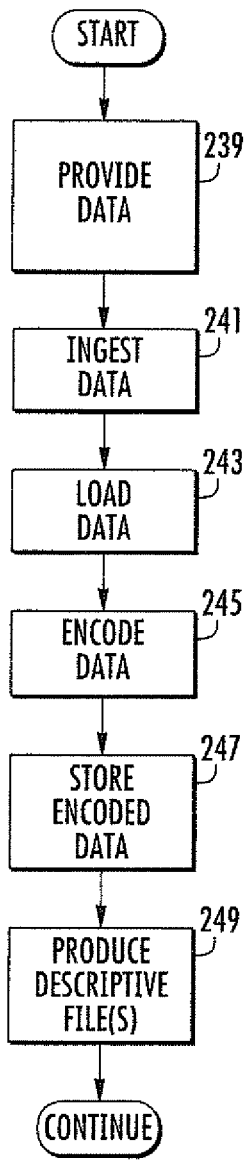
FIG. 2d is a logical flow diagram illustrating one embodiment of the method of ingesting data (packetized or raw) from a local packaging source according to the invention.

Alternatively, for the local ingestion of the material (whether encoded, such as e.g. MPEG data, or raw) the exemplary process of FIG. 2d is performed as referenced to FIG. 2a. First, the data content is provided (step 239) and then locally ingested using, e.g., the Packager entity UI (step 241) and associated HTTP protocol. For "data_raw" types, the Packager may provide MPEG encapsulation to trans-code the file(s) to comply with a data encoding specification.

In step 243, the raw content file is loaded onto the Packager file system. The Packager UI allows the operator to specify that the file requires encoding, and the MPEG packetizer is triggered to convert the file into an MPEG SPTS per step 245.

In step 247, the converted MPEG file is stored on the Packager file system.

Lastly, the packager produces an ADI.XML and an ADI.DTD file describing the new package (step 249).

Figure 2E:
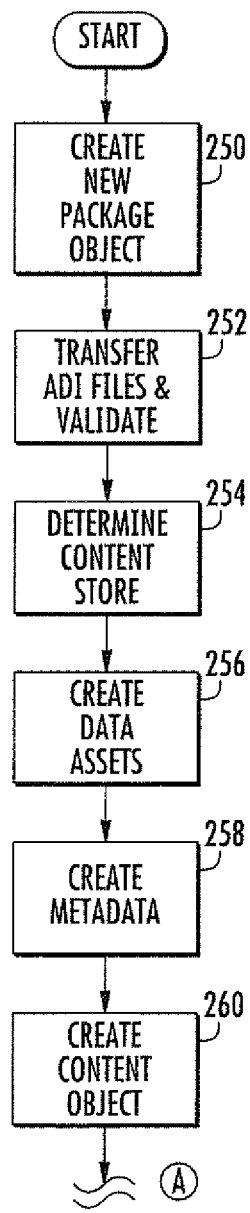
FIG. 2e is a logical flow diagram illustrating one embodiment of the method of provisioning ISA packages according to the invention.
Figure 2E:
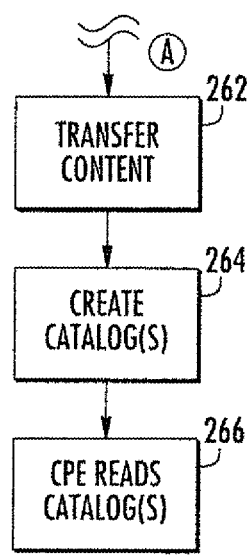

For provisioning of standard ISA packages, the exemplary process of FIG. 2e is employed (referenced to FIG. 2a). For data file provisioning, this process is optionally made identical to the standard ISA VOD provisioning, except for the differences as noted.

In step 250, the Packager entity creates a new Package object on the PackageFactory entity 276. The new Package object provisioning includes passing a Uniform Resource Locator (URL) of the ADI files.

In step 252, The PackageFactory entity transfers the ADI files from the Packager 271, and validates their content. The PackageFactory calls the Application associated with the Product found in the ADI to determine which ContentStore should be used to store the content (step 254).

In step 256, the PackageFactory creates (Data) Assets within the AssetFactory 280.

In step 258, The PackageFactory 276 creates metadata that corresponds to the metadata found in the ADI file.

In step 260, the PackageFactory creates a Content object on the ContentStore returned from the Application. The Content object is provisioned with the URL of the content file on the Packager file system.

Per step 262, the ContentStore entity 281 transfers (e.g., via FTP or other such protocol) the content file from the Packager file system. In the exemplary embodiment, the ContentStore does not generate a "trick-mode" or corresponding file from the Data Asset MPEG file. The Video Server will receive an indication of a data (versus content) file by either (i) parsing the metadata, or (ii) by the stream_type indication (0x05) located in the PMT.

In step 264, the Application entity 290 creates a set of catalogs that contain the new Package object. This may be done automatically, based upon a condition precedent, at a specific time-of-day, by manual operator action, etc. Catalogs are placed on the Broadcast File System (BFS) 292 or suitable data carousel (e.g., the OCAP Object Carousel).

In step 266, the client device 106 (and its resident application(s) 294) reads the new catalogs, and advertises the new titles, games, etc. to the viewer.

Data Session and Stream Creation—

Figure 3:
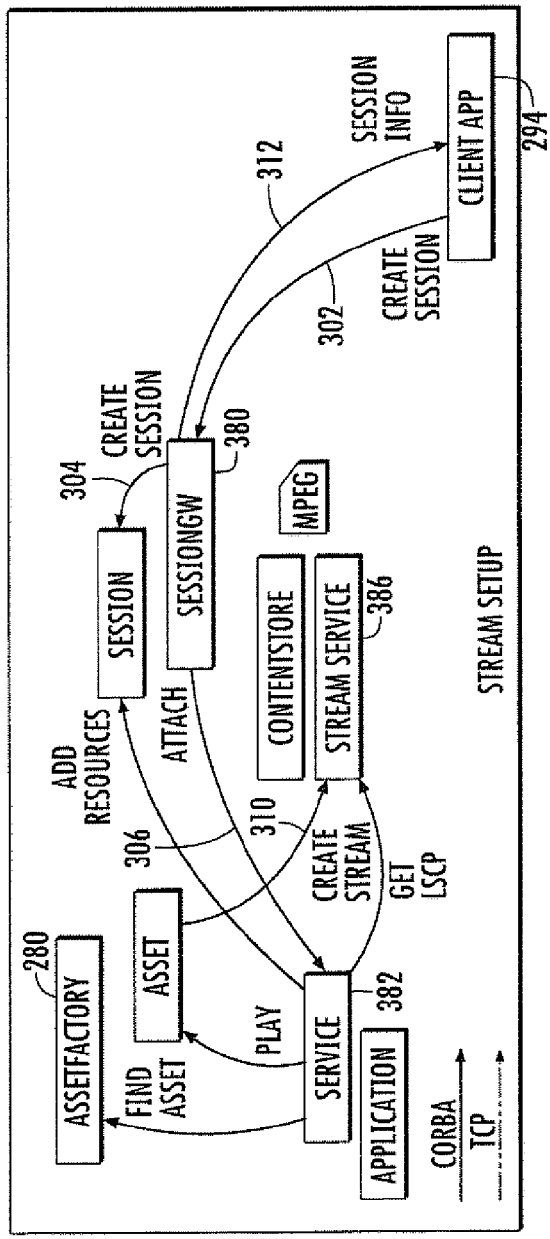
FIG. 3 is a graphical representation of an exemplary embodiment of the session and data stream establishment process, and the various entities utilized therein, according to the invention.
Figure 3A:
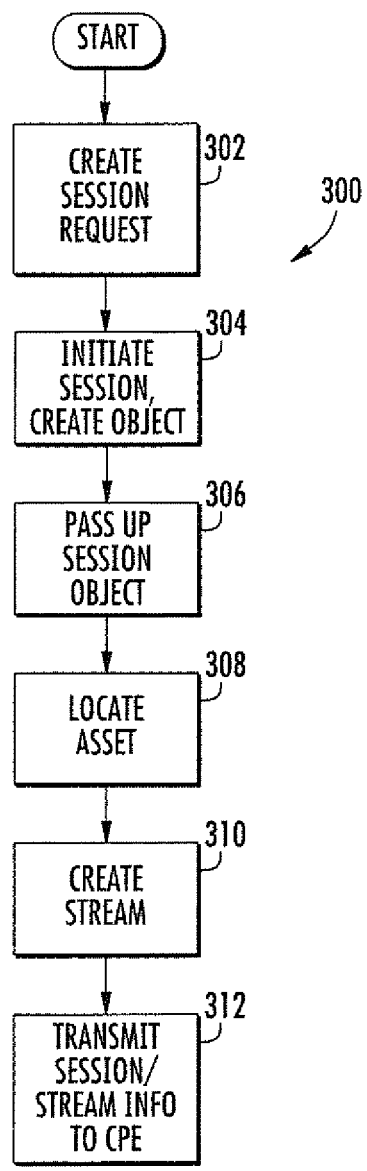
FIG. 3a is a logical flow diagram illustrating an exemplary embodiment of the method of session and stream establishment according to the invention.

Referring now to FIGS. 3 and 3a, an exemplary process flow used in data session and stream creation is described in detail.

Since it is often advantageous to introduce a new service into a cable network without having to add new software interfaces or hardware elements to the existing set up, the following exemplary embodiment of the invention uses session and stream creation methodologies which are completely analogous to a standard VOD flow, thereby minimizing or even obviating any such software and hardware additions. It will be appreciated, however, that such analogous methods are not required to practice the invention; hence, the following discussion is merely illustrative of the broader principles.

As shown in FIGS. 3 and 3a, the first step of the process 300 comprises the relevant client application 294 (e.g., navigation application, Watch TV, dedicated data download application, etc.) on the CPE 106 creating a session request which is passed up to the SessionGW entity 380 using, e.g., the Session Setup Protocol (SSP) per step 302. The SessionGW entity 380 initiates a session by creating a Session object (step 304), and passes the Session object to the Service entity 382 (step 306). The Service entity 382 finds the relevant asset via the AssetFactory 280 (step 308).

The Asset and Service entities then access the Stream Service 386 to access the Lightweight Stream Control Protocol (LSCP), and create the requested stream (step 310). As is well known, the LSCP allows, inter alia, VOD client sessions to communicate directly with a VOD server to control the content as well as streaming trick modes. However, it will be recognized that other protocols providing the desired functionality may be used consistent with the present invention.

Lastly, in step 312, the session information is transmitted back to the initiating CPE 106 via, e.g., an in-band or OOB downstream channel (or other communications channel).

Data Transport Control and Error Correction—

Figure 4:
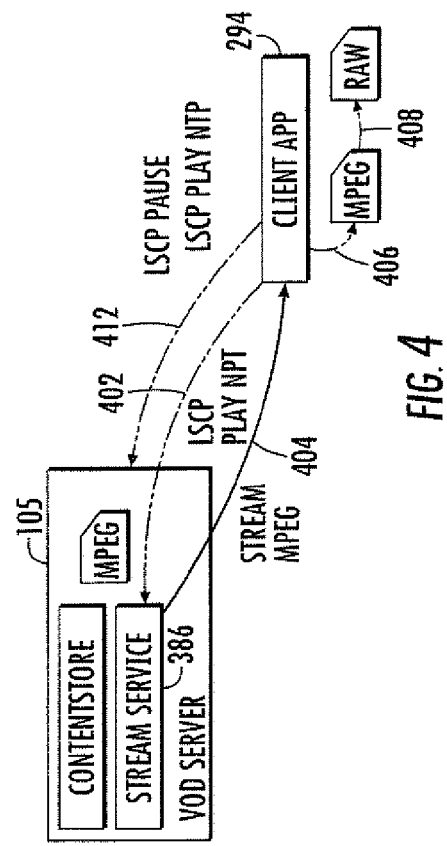
FIG. 4 is a graphical representation of an exemplary embodiment of the client end flow initiation and pause process according to the invention.
Figure 4A:
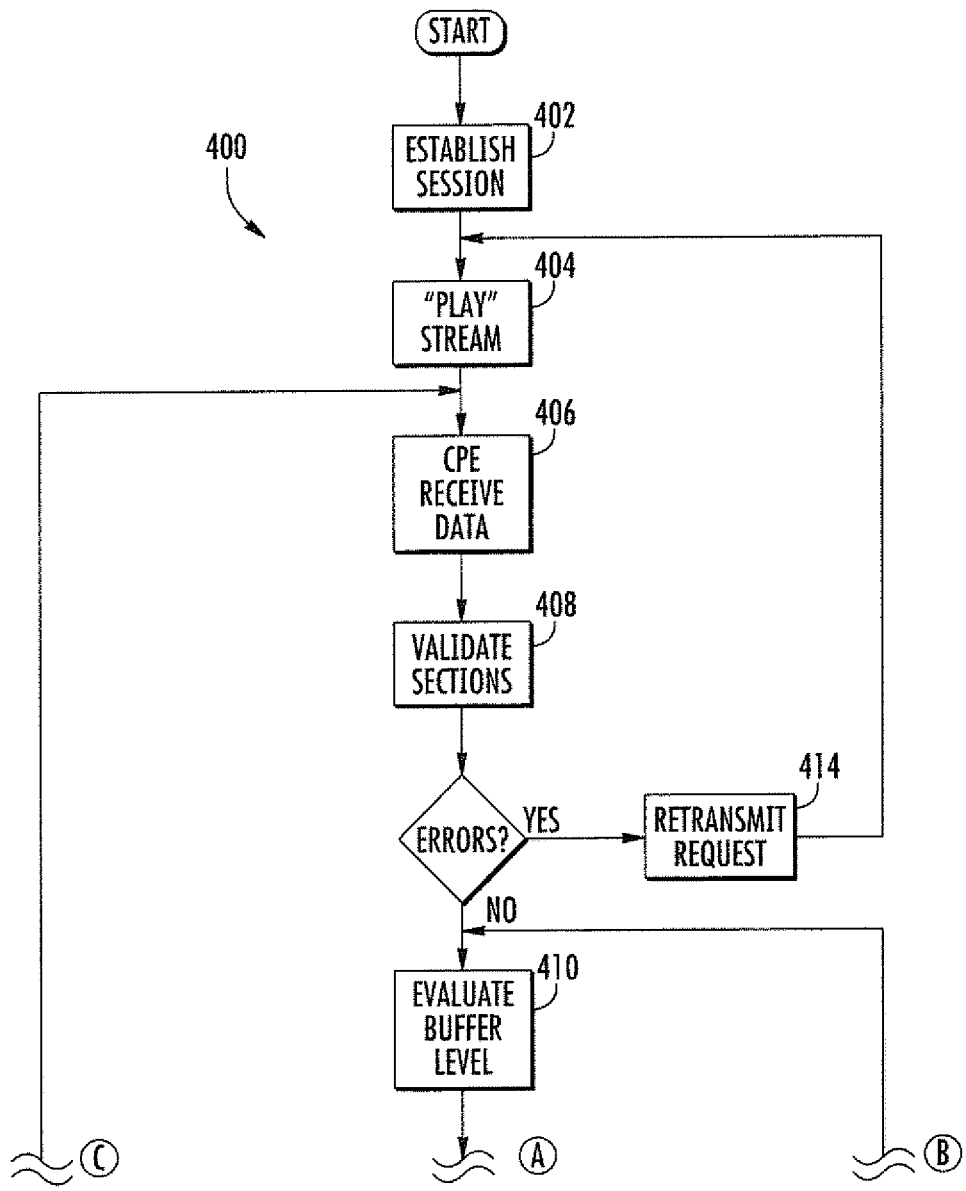
FIG. 4a is a logical flow diagram illustrating an exemplary embodiment of the method of starting the flow of an established data stream according to the invention.
Figure 4A:
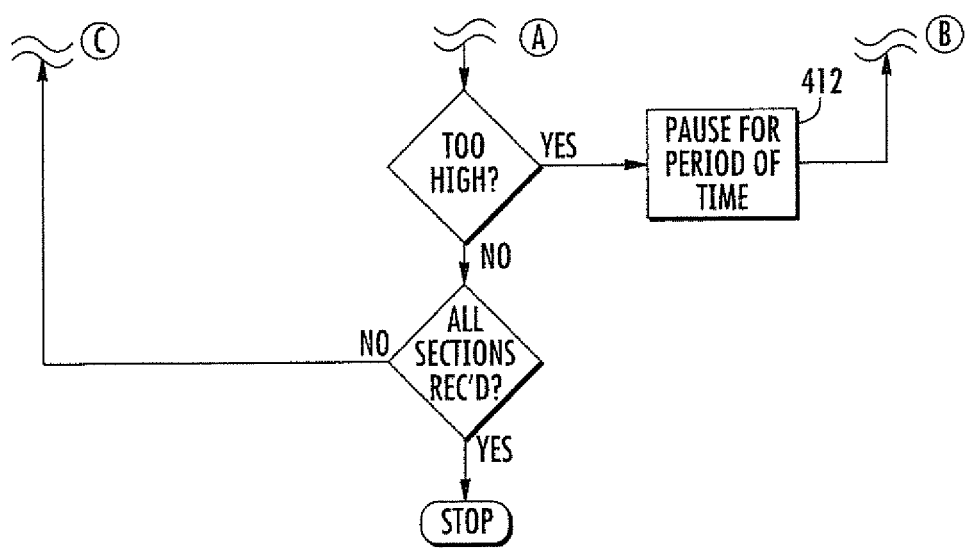

Referring now to FIGS. 4 and 4a, one embodiment of the process 400 of starting a stream that has been created according to the methodology of FIGS. 3 and 3a is described in detail.

As shown in FIGS. 4 and 4a, the client application 294 uses LSCP over TCP (or a comparable protocol) to establish a stream control session with the servicing entity, e.g., VOD server 105 (step 402). This session establishment step includes sending an LSCP "Play" command starting at the beginning of the file (NPT: 0). In step 404, The StreamService entity 386 at the VOD server plays the MPEG or other content at the prescribed rate (e.g., 3.75 Mbps). In step 406, the client application 294 receives the MPEG sections, and validates these sections for integrity per step 408. If the client determines that the data receipt rate exceeds its effective processing rate such as, e.g., by determining that the CPE's buffers are filling faster than its application 294 can decode and validate the MPEG sections (step 410), it may pause the download of the file (step 412).

Per step 412, the client sends an LSCP "Pause" command to allow it time to reduce its buffer levels. Once the CPE buffer returns to an acceptable level, the client can resume download by sending a LSCP "Play" command. Any number of different buffer management techniques may be applied consistent with the invention, including for example a high/low watermark approach, setting/expiration of a timeout value, etc. In one embodiment, an asymmetric high/low watermark approach is used, with the high water mark being offset or dead-banded from the low water mark (i.e., activation of the "Pause" function occurring at a higher buffer level than that at which the reset is activated), thereby mitigating cycling between the two states. In an alternate embodiment, a "Pause" command is issued at a certain buffer level (increasing), and a timer invoked that keeps the Pause state in effect for a prescribed period of time. It will be recognized by those of ordinary skill in the packet communication arts that myriad other approaches may be used as well.

If the client discovers an error while processing its MPEG sections (per step 408), the client may request the VOD server 480 (or other servicing entity) to restart playback (step 414) from a previous section of the data stream. In one embodiment, the LSCP "Play" command is used, passing the NPT (normal play time) value calculated by the client application 294 based on the last known correct section. Exemplary methods utilized by the client application 294 for calculating the new NPT are described below with respect to FIG. 7b and Appendix I.

In one embodiment of the data encoding methodology of the invention, the raw data stream is mapped into a format that is more suitable for transmission over the chosen bearer network. For example, in one variant, the network comprises an HFC cable television network, and the encoding of the raw data is performed using, e.g., the CableLabs® Video-On-Demand Content Encoding Profiles Specification (MD-SP-VOD-CEP-I01-040107) dated Jan. 7, 2004 (with the exclusion of video and audio parameters) in order to maintain compatibility with the ISA specification. It will be appreciated by those of ordinary skill that other encoding approaches may be used as well, the foregoing being merely illustrative.

The data encoded according to the chosen scheme is packetized in a format suitable for transportation of the data to the CPE 106. To maintain compatibility with current cable systems, this requires an initial packetization process in order to create a valid MPEG-2 Transport Stream. Several implementations of this packetization process are possible. For example, one implementation utilizes the MPEG-2 private-_section field for encapsulating the data files (as described below). The syntax of MPEG-2 private_section is shown in Appendix I hereto. Another implementation may use the well-known DSM-CC format or the like.

Per the exemplary MPEG-2 standard, the Program Map Table (PMT) provides the mapping between the number of a program (PID) and the elements that comprise the program. In embodiments of the present invention based on ISA-compliant cable networks, packetization of the data files should be performed so as to create a single program comprised of MPEG-2 private sections. In such cases, the stream_type is set to 0x05 which identifies ITU-T Rec. H.222.0 ISO/IEC 13818-1 PES private_sections. The PMT can be located at the standard VOD stream location; i.e., PID 0x1E0 (480). The PID containing the private_section data is located at 0x1E1 (481). Other mapping schemes, including those not complaint with the aforementioned standards (such as in proprietary network applications), may also be utilized if desired.

It is advantageous to have the aforementioned encapsulated data files formatted such that playback of the files will not require any modifications to the standard VOD server 105 or other infrastructure within the network. The CPE application 294 is also configured so as to be able to decode the transport stream and reassemble the data file at the CPE 106 at a desired rate. In one exemplary embodiment of the invention, Program Clock References (PCRs) located in the existing MPEG-2 transport stream infrastructure are used to manage the playback bit-rate of the data stream.

In conventional cable VOD systems, program streams are assigned a fixed bit-rate. For example, 3.75 Megabits/second in a commonly used bit-rate for video streams in the conventional VOD deployments. In one exemplary embodiment of the invention, bandwidth equivalent to an integer (N) multiple of a "baseline" VOD program bandwidth is allocated to the data transfer according to the following relationship:

$$\text{Data bandwidth} = \text{Baseline bandwidth} \times N \qquad \text{Eqn. (1)}$$

For example, in a VOD system where video channels are allocated 3.75 Mbps each (SD), the data transfer of the invention can be allocated 3.75 Mbps, 7.5 Mbps (i.e., two times 3.75), 11.25 Mbps, (three times 3.75), and so forth. Alternatively, the full bandwidth of a channel (e.g., one 256-QAM), or roughly 38 Mbps (N=10), can be allocated to a given data session. Other baseline data rates may be used also, such as e.g., roughly 15 Mbps corresponding to an HD session. In one embodiment, the ADI file can be used to perform the selection, although it will be appreciated that other mechanisms may be employed.

In another embodiment, two or more different data streams may share bandwidth, and hence rates that are non-integer multiples of the baseline video rate can be achieved if desired. This approach allows for a finer level of control and variability within the bandwidth allocation mechanisms, yet also makes the allocation process more complex as compared to the simple integer-based approach discussed above.

Catalog Functions—

As noted above with respect to FIG. 2a, the exemplary process of the invention creates one or more catalog entries for the ingested data file(s) so that the user's CPE 106 can be made aware of the availability of the data file(s). These catalog entries can be made generic or standardized in nature, or alternatively application specific (e.g., with respect to the client application 294). Alerts or notice to the user can be accomplished via, e.g., a navigator application implemented on the CPE 106, or some other user interface (UI) mechanism including on-screen alerts, audible signals, periodic or regularly scheduled status functions, etc.

The navigator deployed in cable networks operated by the Assignee hereof uses an exemplary catalog structure (see FIGS. 5a-5d herein) to carry all data to its CPE 106. Accordingly, one embodiment of the present invention utilizes the same catalog structure for consistency, although it will be recognized that other structures may be used. For existing on-demand (OD) services, three specific catalog structures are used (i.e., Group, OnDemand Menu3, and OnDemand Selection).

Figure 5A:
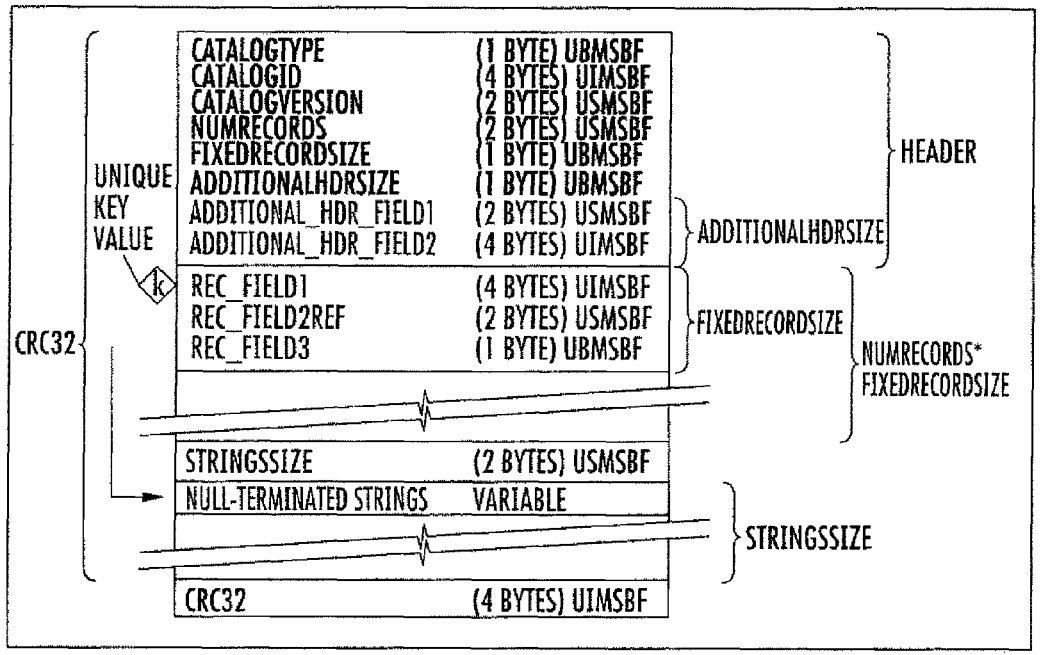
FIG. 5a is a graphical representation of one exemplary basic catalog structure useful with the present invention.

FIG. 5a illustrates an exemplary basic construct of the catalog. All catalogs derive from this basic structure.

Figure 5B:
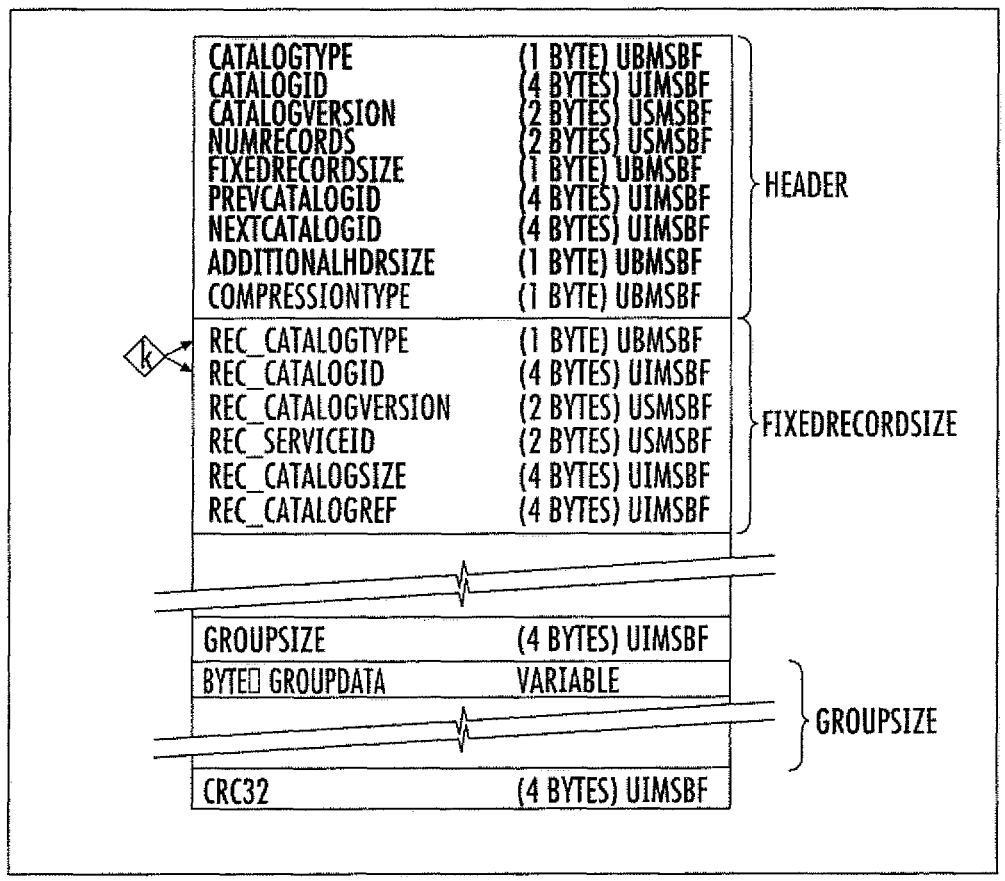
FIG. 5b is a graphical representation of one exemplary group catalog structure useful with the present invention.

FIG. 5b illustrates an exemplary group catalog structure useful with the present invention.

Figure 5C:
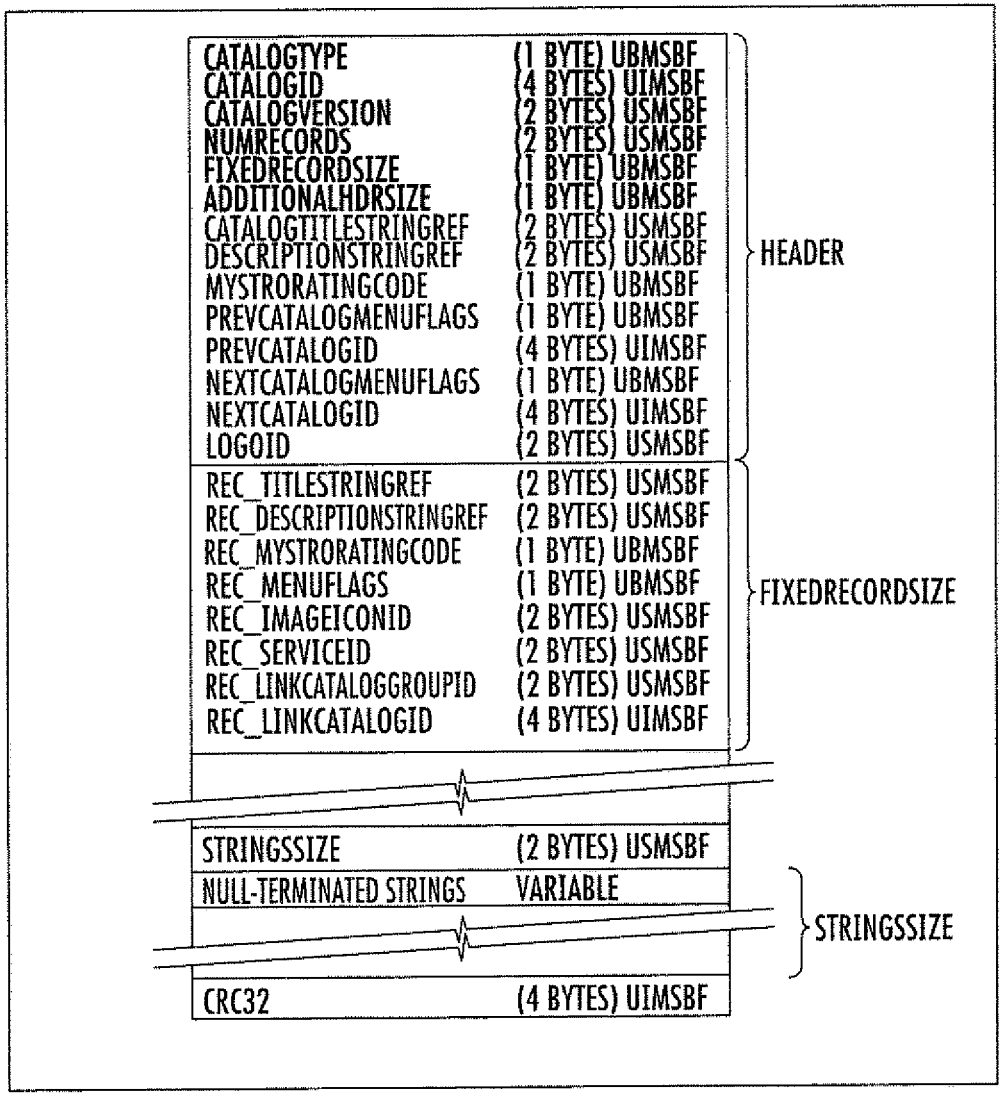
FIG. 5c is a graphical representation of one exemplary on-demand menu ("Menu3") catalog structure useful with the present invention.

FIG. 5c illustrates an exemplary OnDemand Menu3 Catalog Structure useful with the invention. See also Appendix II (OnDemand Menu3 Catalog MenuFlags Types) and Appendix III (OnDemand Selection Catalog Offering Types) hereto.

Figure 5D:
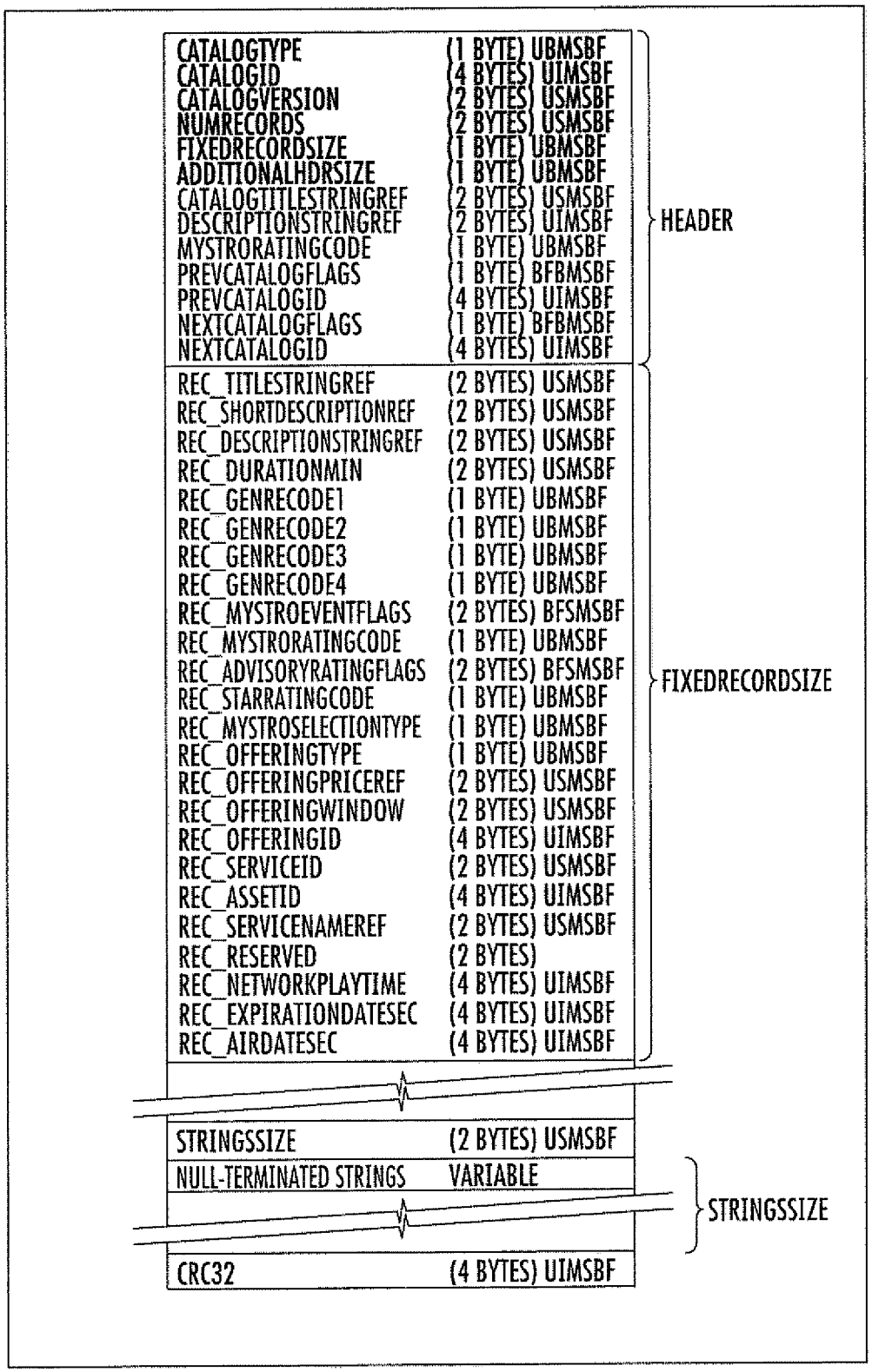
FIG. 5d is a graphical representation of one exemplary on-demand selection catalog structure useful with the present invention.

FIG. 5d illustrates an exemplary OnDemand Selection Catalog Structure useful with the invention. See also Appendix IV (OnDemand Selection Catalog Selection Types).

ADI Metadata Data Asset Type—

As will be recognized, it is important to provide consistent handling of the metadata (e.g., ADI Package metadata) for data MPEG types such as an ADI "raw" data file. This metadata is used, inter alia, to communicate with the VOD server 105 so as to avoid trick-mode generation (undesired during data operations), including disabling fast-forward and reverse play of the stream. Advantageously, this functionality can be readily implemented within existing architectures, such as e.g., through minor changes to the ADI specification previously referenced herein. Appendix V hereto provides an exemplary modification to the relevant ADI specification (i.e., CableLabs® Video-On-Demand Content Specification Version 1.1, MD-SP-VOD-CONTENT1.1-I03-040107 dated Jan. 7, 2004).

Specifically, in the illustrated embodiment, the Asset_Class and Type fields are used to contain non-video MPEG data. Asset_Class is an exemplary system-level type descriptor for the asset. This is intended for use with application mapping and routing, and is more general than the "Type" value for the content.

The exemplary "Type" field determines how and where an asset is stored in the system. For example, values of this field might comprise "data_mpeg" or "data_raw". If the type is "data_raw", then the ingestion process will convert the data file into an MPEG file compliant with the relevant data encoding specification.

Upon receipt of the encoded data packets, the CPE 106 removes the MPEG section packing, and reassembles the original data structure (e.g., file). As noted, these re-assembled data files may be for any number of different applications including, e.g., game download and "video-to-go" files that may be later downloaded or transferred to external devices. The ingesting VOD server 105 at the head-end interprets the Asset_class (e.g., "data") and Type (e.g., "data_mpeg" or "data_raw") metadata fields, and does not attempt to generate a trick-mode file used for fast-forward and reverse play. Also, the VOD server uses the Asset_class and Type fields to disable trick-mode commands initiated using the Lightweight Stream Control Protocol (LSCP).

It will also be recognized that the exemplary scheme of Appendix V may be expanded or modified in order to provide further information about the content, such as for example data relating to encryption/keys (including, e.g., key lengths, residues or checksums), signatures or certificates, compression schemes, other applied data encoding schemes, CRC/FEC data, etc.

Network Server—

Figure 6:
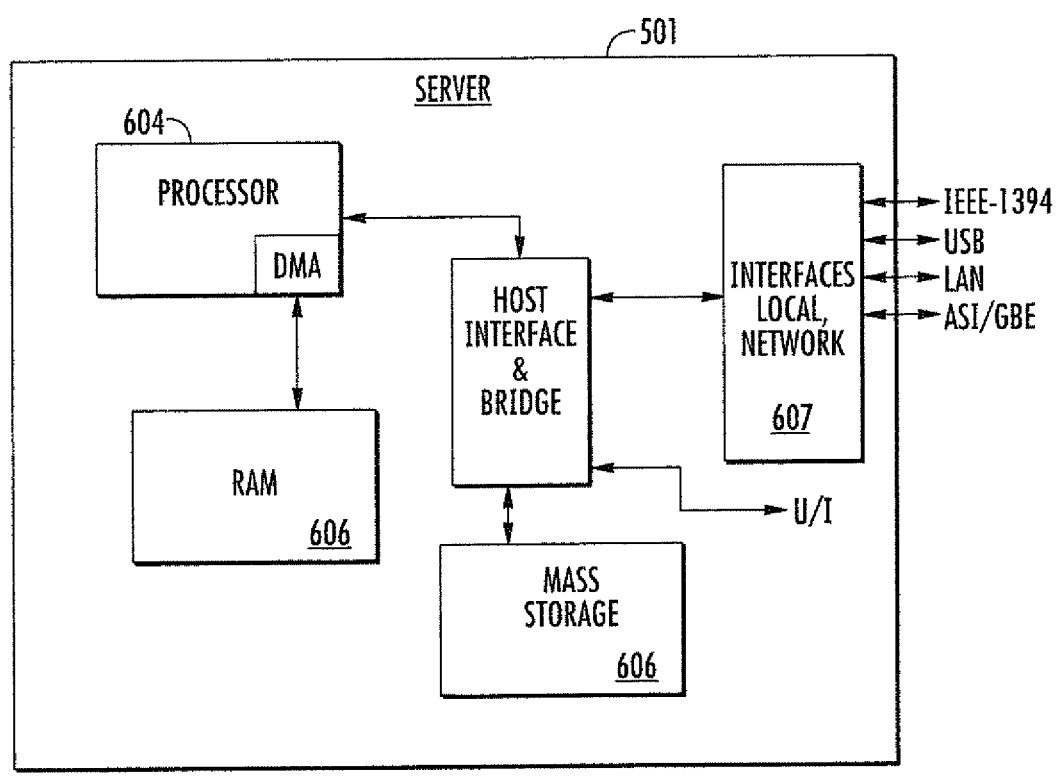
FIG. 6 is a functional block diagram of one exemplary embodiment of network server adapted for high-speed data download.

Referring now to FIG. 6, one embodiment of the improved network electronic device with high-speed data download capability according to the present invention is described. As shown in FIG. 6, the device 601 generally comprises and OpenCable-compliant network server module adapted for interface with the HFC network 101 of FIG. 1 (e.g., the MEM 162 at the head-end, and/or the LAN 158, 160), digital processor(s) 604, storage device 606, and a plurality of interfaces 607 for use with other network apparatus such as IP routers and other packet network devices, network management and provisioning systems, local PCs, etc. Other components which may be utilized within the server device 601 include amplifiers, board level electronic components, as well as media processors and other specialized SoC or ASIC devices. Support for various processing layers and protocols (e.g., 802.3, DOCSIS MAC, OOB channels, DHCP, SNMP, H.323/RTP/RTCP, VoIP, SIP, etc.) may also be provided as required. A VOD application is also disposed to run on the server module 601 to provide a functional interface for VOD session requests received from network CPE 106, or other interposed entities. These additional components and functionalities are well known to those of ordinary skill in the cable and embedded system fields, and accordingly not described further herein.

The server device 601 of FIG. 6 may take any number of physical forms, comprising for example one of a plurality of discrete modules or cards within a larger network head-end or edge device of the type well known in the art, including the MEM 162 itself. The server may also comprise firmware, either alone or in combination with other hardware/software components such as those previously described (e.g., disposed in the aforementioned edge device). Alternatively, the server module 601 may be a stand-alone device disposed at the head end or other location (such as a VOD server 105 or application server 104), and may even include its own RF front end (e.g., modulators, encryptors, etc.) or optical interface so as to interface directly with various portions of the HFC network 101. Numerous other configurations may be used. The server device 601 may also be integrated with other types of components (such as satellite transceivers, encoders/decoders, etc.) and form factors if desired.

It can also be appreciated that the methods of the present invention may be practiced using any configuration or combination of hardware, firmware, or software, and may be disposed within one or any number of different physical or logical entities. For example, the data ingestion, packaging and delivery functionality described above may take the form of one or more computer programs running on a single device disposed within the network (e.g., the VOD server module 105), such as at a head-end, node, or hub. Alternatively, such computer programs may have one or more components distributed across various hardware environments at the same or different locations, such as the architecture shown in FIG. 2a, wherein various of the functions are distributed across the VOD servers 105, application servers 104 and Business Management System (BMS).

As yet another example, portions of the functionality may be rendered as a dedicated or application specific IC having code running thereon. Myriad different configurations for practicing the invention will be recognized by those of ordinary skill in the network arts provided the present disclosure.

CPE Architecture and Operation—

Figure 7:
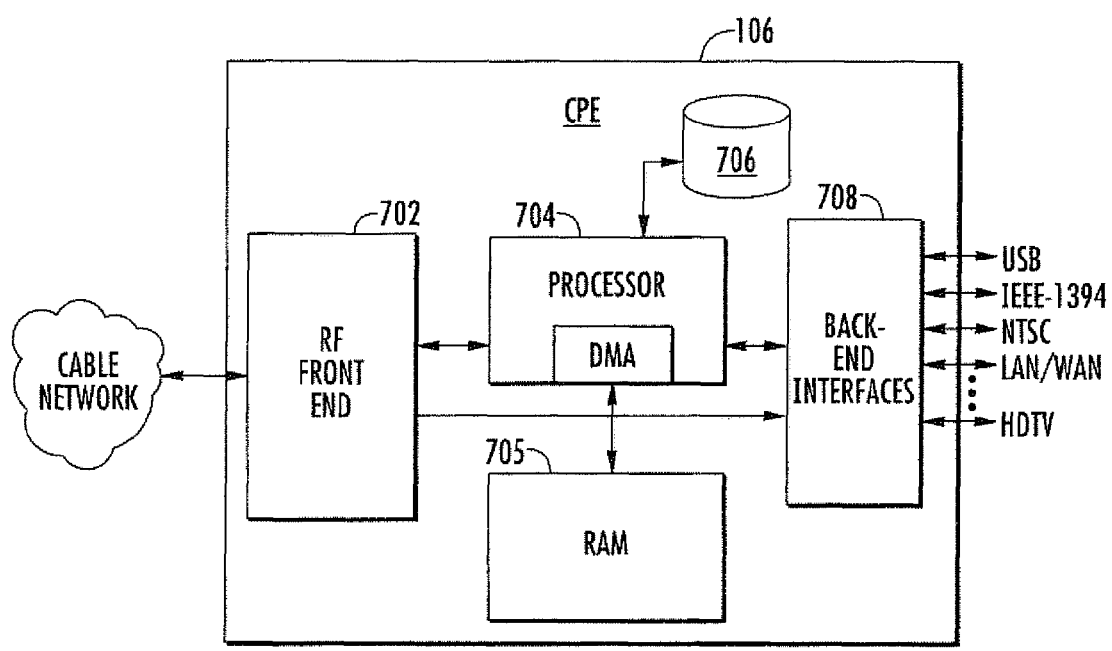
FIG. 7 is a functional block diagram of one exemplary embodiment of network CPE adapted for high-speed data download.

FIG. 7 illustrates a first embodiment of the improved client device (e.g., CPE 106) with data download capability according to the present invention. As shown in FIG. 7, the device 106 generally comprises and OpenCable-compliant embedded system having an RF front end 702 (including demodulator and decryption unit) for interface with the HFC network 101 of FIG. 1, digital processor(s) 704, RAM 705 and mass storage device 706, and a plurality of interfaces 708 (e.g., video/audio interfaces, IEEE-1394 "Firewire", USB, serial/parallel ports, etc.) for interface with other end-user apparatus such as televisions, personal electronics, computers, WiFi/PAN or other network hubs/routers, etc. Other components which may be utilized within the device (deleted from FIG. 7 for simplicity) include RF tuner stages, buffer memory (which may be implemented in the RAM 705 or otherwise), various processing layers (e.g., DOCSIS MAC or DAVIC OOB channel, MPEG, etc.) as well as media processors and other specialized SoC or ASIC devices. These additional components and functionality are well known to those of ordinary skill in the cable and embedded system fields, and accordingly not described further herein.

The device 106 of FIG. 7 is also provided with an OCAP-compliant monitor application and Java-based middleware which, inter alia, manages the operation of the device and applications running thereon. It will be recognized by those of ordinary skill that myriad different device and software architectures may be used consistent with the display element manager of the invention, the device of FIG. 7 being merely exemplary. For example, different middlewares (e.g., MHP, MHEG, or ACAP) may be used in place of the OCAP middleware of the illustrated embodiment.

As described in greater detail subsequently herein, the processor 704 and internal bus and memory architecture of the CPE 106 of FIG. 7 is ideally adapted for high-speed data processing, at least sufficient to support the client-side processing tasks (see FIG. 7b) necessary to implement the high-speed data download functionality of the present invention effectively in real time. This may be accomplished, e.g., through a single high-speed multifunction digital processor, an array of smaller (e.g., RISC) cores, dedicated processors (such as a dedicated MPEG media processor, CPU, and interface controller), etc.

Figure 7A:
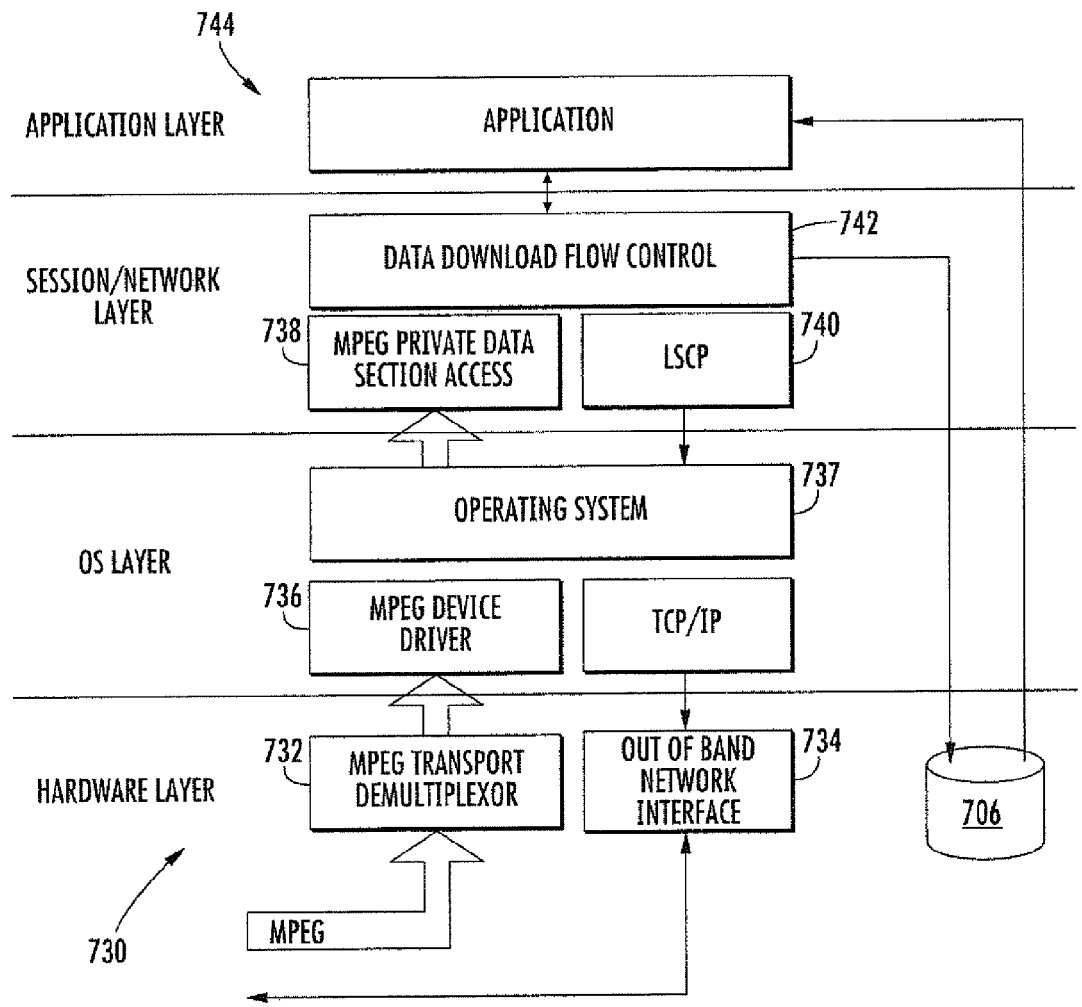
FIG. 7a is a graphical representation of an exemplary protocol stack useful with the CPE of FIG. 7.

FIG. 7a illustrates an exemplary configuration of the protocol stack 730 used on the CPE 106 of FIG. 7. Elements of this embodiment of the stack 730 include: (i) MPEG transport interface (demultiplexer) 732, (ii) OOB network interface 734, (iii) MPEG device driver 736, (iv) operating system (including aforementioned middleware) 737; (v) MPEG private data section access module 738, (vi) LSCP protocol module 740, and (vii) data download flow control module 742. As indicated in FIG. 7a, the local (or even remote) storage device 706, or alternatively RAM 705, is used to store data received by the CPE and extracted from the encoded packets as described in greater detail below. This data, which may comprise files (such as executables, compressed data files, etc.) or other data structures is utilized by the application layer 744 of the stack 730, or alternatively transmitted off-device for use by another processing entity such as a peripheral or client device to the CPE "host".

As part of the application layer 744 of the CPE 106, various different types of client applications 294 may be running (or operable to run) consistent with the present invention. In one embodiment, a separate (dedicated) client application adapted for high-speed data download may be used to interface with the lower layers of the stack 730 (including the data download flow control module 742). This may include, e.g., a separate GUI or other type of UI, and may operate substantially independent of other applications on the CPE 106. Alternatively, the data download functionality described herein may be integrated into one or more existing or downloadable applications (such as a VOD application, "Watch TV" application, navigator, or even EPG).

As yet another option, the download functionality nay be completely transparent to the end user, such as where a gaming application running on the CPE 106 (or an associated device) makes data download "calls" as necessary to the other components of the stack in order to (i) initiate a session if not already established, (ii) download the data, including any necessary error correction and/or retransmission, and (iii) manage termination of the session; e.g., collapsing it if no further downloads are anticipated, or alternatively keeping it open while the parent (gaming) application is active. The CPE middleware and any other relevant components may also be modified in order to provide a "universal" software interface for the data download function, such that application developers can write their applications to make use of this capability. Similarly, the "universal" CPE described in co-pending and co-owned U.S. patent application Ser. No. 10/782,680 filed Feb. 18, 2004 and entitled "MEDIA EXTENSION APPARATUS AND METHODS FOR USE IN AN INFORMATION NETWORK", incorporated herein by reference in its entirety, may be used consistent with the present invention in order to allow specific features (including data download) to be configured by a particular MSO or other entity when the CPE is used in their network.

In still another embodiment, the client application 294 can function in response to signals or communications provided by a device in communication with the CPE 106. For example, the CPE 106 may comprise a wireless interface (e.g., 802.11a/g, Bluetooth, 802.15 PAN, 802.16 WiMAX, etc.) such that it can service data download requests from client devices of the CPE 106 itself. In one such variant, the client device comprises a PDA or similar handheld device which has a distributed portion of the client application 294 running thereon. This application may be stand-alone or integrated with another application, such as a gaming application. Hence, users operating the e.g., gaming application on the PDAs will utilize their wireless interface to the CPE 106 in order to remotely instigate a data download from the network via the CPE. The wireless forward channel(s) of the interface (e.g., CPE to PDA) can be used to transmit the downloaded data file after reassembly by the CPE, or even stream the "raw" unassembled data (or even the received and demultiplexed MPEG encoded packets) to the PDA(s) for use thereby. This approach advantageously allows users within, say, a home to pick up their respective PDAs or gaming devices, initiate the gaming application via these devices, and download any necessary games, data files, etc. without having to directly interact with the CPE 106 via its navigator or other application. The users need merely stay within sufficient proximity of the CPE 106 during the data acquisition process.

Myriad other schemes for integrating the data download functions within the existing CPE software environment will be recognized by those of ordinary skill in the software arts when provided the present disclosure.

Figure 7B:
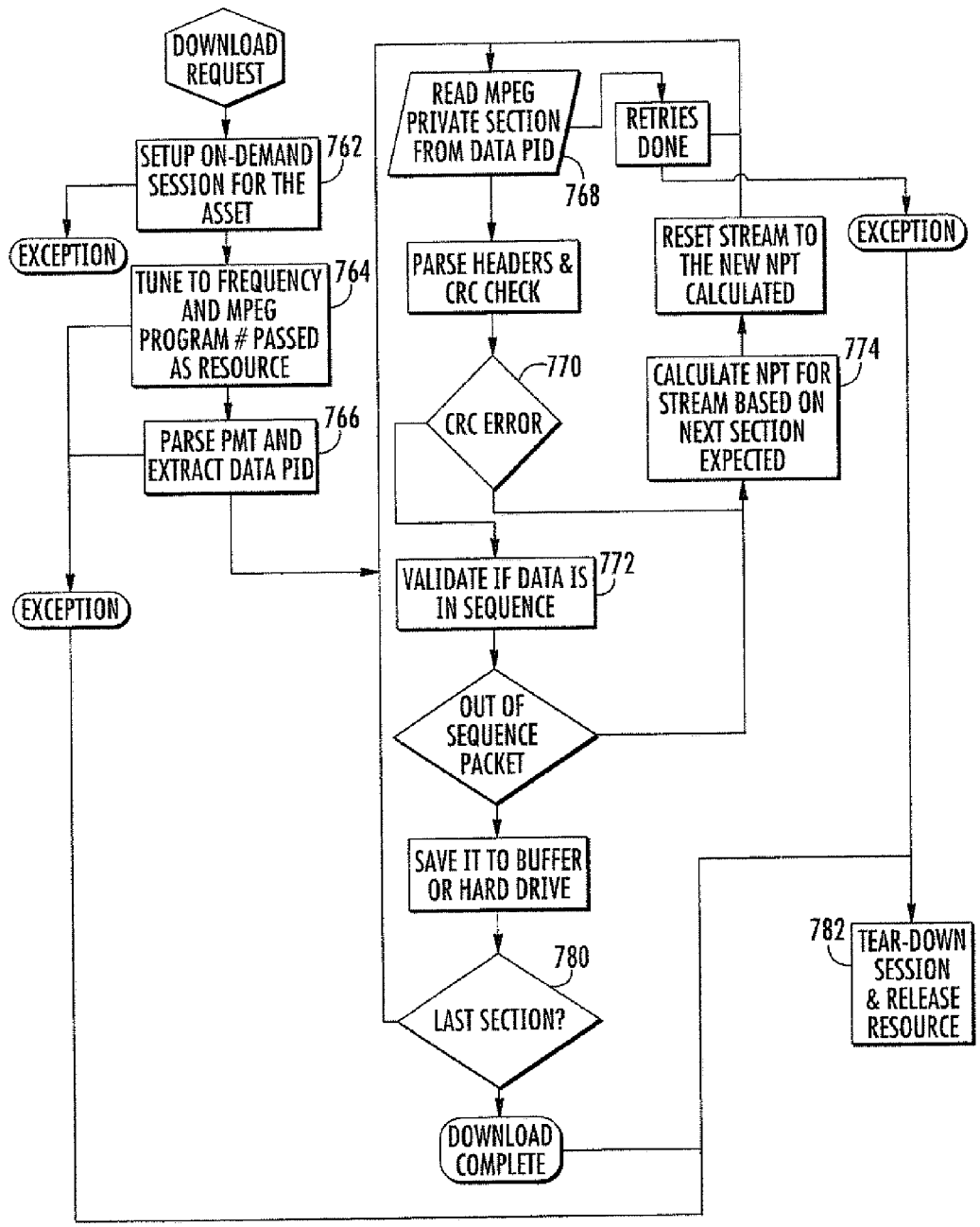
FIG. 7b is a logical flow diagram illustrating an exemplary embodiment of the client side data download processing conducted according to the invention.

Referring now to FIG. 7b, one exemplary embodiment of the client side data download process flow is described in detail. As previously discussed, a first step in performing the data download comprises the establishment of a session via which the data may be transferred (step 762). In the exemplary embodiment, the CPE 106 initiates an on-demand (OD) session for data download for a given asset ID. In cable networks compliant with the ISA specification, the session setup process is based on the well-known Session Setup Protocol (SSP), such as SSP Version 2.1. An asset ID (or offering ID) is used to identify the packetized data stream; this ID is accessed by the CPE 106 using, e.g., the OD catalog structures associated with an exemplary system. Alternatively, some other structure or mechanism adapted to transfer this information to the CPE 106 can be utilized.

Upon successful setup of the session, the OD server (e.g., VOD server 105 of FIG. 1a) sends back information necessary for the CPE 106 to tune to the appropriate QAM (and MPEG program number that contains the data PID) used to transport the data (step 764). Since the CPE requires the exact MPEG data PID in order to access the MPEG private section, it must parse the Program Map Table (PMT) to determine the data PID value associated with the MPEG program to which it is tuning (step 766).

After successful tuning to the physical channel(s) carrying the data payload, the CPE 106 must then (i) start the data stream, (ii) extract the data from the MPEG private data section, and (iii) reliably re-assemble the data to its original payload configuration (e.g., file or other data structure).

In the exemplary implementation, the client application 294 running on the CPE 106 starts the data stream by issuing the LCSP "Play" command to play from the zero (0) location. It will be appreciated that an MPEG "private section" control approach is utilized in the illustrated embodiments, other approaches may be substituted with equal success such as, without limitation, a Digital Storage Media-Command and Control (DSM-CC) based stream control in accordance with ISO/IEC 13818-6:1998(E).

As the data stream begins flowing to the CPE, the client application 294 extracts the data from all packets having the appropriate PID using its MPEG demultiplexing hardware or a comparable process (step 768). Once the entire MPEG private_section carrying the data is available, the client application 294 computes the CRC on the payload to assure the integrity of the data (step 770), and verify that there are no transmission errors therein. If the CRC fails, the failing section(s) can be discarded (or otherwise segregated for later use or analysis).

Once the CRC validates the data, the client application 294 evaluates whether the data received is in the proper sequence by, e.g., looking at the section numbers that are part of the packet headers in the payload (step 772). The exemplary scheme used comprises having the section numbers start from zero and increment in ascending order. By keeping track of the section number of the last valid payload that was received properly, the client application 294 can detect if the sequence number from the next section being processed is in proper sequence or not. If the section number falls within the expected sequence, the data from the payload is appended to the data previously received for re-assembly.

If the CRC fails, or a given section received is out of order, then the client application sends an LSCP message to the server to reset the position in the stream to the NPT location that corresponds to the next valid section that was expected by the client (step 774). By sending the LSCP message to reset to a previous location in the stream, the server will re-transmit those sections that were lost or damaged in transmission. During re-transmission, the client application continues the re-assembly process when it receives the next expected data section, and the data stream flow is back in the proper order.

It will be appreciated that a buffering scheme may also be applied to the evaluation of section numbers described above. For example, instead of applying a strict "in-sequence or out-of-sequence" criterion, a buffer mechanism can be used to allow a certain degree of variation in the sequence without invoking a retransmission. Specifically, in one variant, a simple "plus or minus" criterion is applied, wherein the section number of a received section will not trigger a retransmission if the sequence number falls within a predetermined range of the expected number. The application will then maintain the same range (and starting point) and await the next section.

Alternatively, if the received sequence number exceeds the specified range, it will trigger a retransmission e.g., at the start or lowest sequence number of the range. In this fashion, the occasional out-of-sequence section will not cause a retransmission. Rather, the buffer maintains a small pool of sections whose order can be permuted to properly re-assemble (resequence) the sections.

The payload headers in the exemplary packetization scheme also include the last section number in the sequence, and hence the client application can detect when it has received all of the data by matching the last section number received to the last section number in the header.

Upon detecting of end of the sequence (step 780), the client application 294 terminates the on-demand session by sending a session release request or similar communication (per step 782), and passes back the fully assembled payload to the requesting entity (which may include the client application 294 itself, or another application as previously discussed).

In one embodiment of the invention, the transmission rate for the data transfer stream is intended to be very high as compared to conventional data downloads to the CPE 106. For example, a data rate of 3.75 Mbps (corresponding to one VOD program) can be used. A typical implementation that uses MPEG private sections of length 4096 bytes will have a nominal rate of approximately 115 packets per second. This translates to (on average) about 8.7 milliseconds available to process each private section. Hence, fairly tight timing within the system must be observed in order to attain this high rate of data transfer to the CPE. As the data rate is increased, the timing constraints accordingly increase as well.

Hence, the implementation of the client device 106 (and client application 294 running thereon) should be highly optimized; e.g., to consume as few CPU cycles as possible in order to process the data and pass it to the requesting application within these time constraints. The implementation should also transfer the data from the MPEG transport demultiplexer to the application with as few data copies as possible.

As one alternative, the data may be buffered to allow a "slower" CPE to still download at a higher rate. Since the data downloads are finite in size, the buffers may be sized accordingly. This approach allows legacy (slower) CPE to download at the faster rate, and subsequently collapse the OD session (thereby conserving network bandwidth), in exchange for longer processing time of the buffered data at the CPE. Optionally, a constraint may be imposed that any existing OD session cannot be terminated until at least the CRC/sequencing is performed on the buffered data, in case a retransmission was required. Myriad alternative schemes for managing the data download/CPE processing rates will be recognized by those of ordinary skill provided the present disclosure.

In one exemplary embodiment, upon receipt of an invalid section within the stream, the CPE 106 utilizes the LSCP (or a similar mechanism) to request that the VOD server 105 resume playback at a point prior the beginning of the invalid section. Calculating the proper NPT for this function can be accomplished in a number of different ways, such as by multiplying the requested section_number by the section_number multiplier which is contained in the table_id_extension field of the private_section header. Upon restart, the CPE 106 may receive duplicate packets of a previous section before it can resume reassembly of the data file. Accordingly, the client application 294 is configured to disregard or discard these packets until it receives the packet associated with the start of the section_number it has requested, so as to avoid assembling the duplicate packets into the payload. Other approaches for culling out duplicate packets may also be employed, such as use of a separate re-assembly/compression algorithm after all of the received packets (whether duplicate or not) have been aggregated by the client application 294.

Wideband and Multi-QAM Variants

While the foregoing embodiments of the present invention are described primarily in terms of an OD infrastructure adapted to transmit data over a single physical channel (e.g., 256-QAM modulated carrier) at any given time, it will be recognized that this "physical channel" may actually comprise one or more carriers. For example, in one multi-carrier variant of the invention, the non-content data is streamed over multiple physical carriers according to a multiplexing algorithm such as that described in co-owned and co-pending U.S. patent application Ser. No. 11/013,671 filed contemporaneously herewith and entitled "Method And Apparatus For Wideband Distribution Of Content", incorporated herein by reference in its entirety. Under this approach, the data of a given TS can be multiplexed across a plurality of physical carriers, with the multiplexed signal being reassembled at the CPE 106 using a wideband tuner (or a plurality of related tuners). Information from the head-end as to the multiplexing scheme and channels used is provided to the CPE in order to enable it to de-multiplex (and decode) the multiplexed transport stream. Hence, for the purposes of the present invention, the aggregation of multiplexed channels acts like a single QAM.

As yet another option, two or more QAMs within the network can be established simultaneously (as part of a single session, or alternatively two distinct but related sessions) to achieve one or more desired objectives, such as an increased download speed or statistical multiplex pool size. For example, where the download speed using a single on-demand session and QAM might be limited to a given value, that value can be increased through use of (i) two or more QAMs, and (ii) use of CPE which has the ability to simultaneously tune to the two or more QAMs and download data (e.g., MPEG packets with the data encapsulated therein). Depending on the extant processing capability within the CPE, this may require varying levels of modification to the CPE including e.g., the addition of a second or wideband tuner/demodulator stage, additional packet processing capability (such as an additional MPEG media processor), more RAM, etc. A common client application 294 can be used to perform data extraction, CRC, etc. as previously described herein for the multiple streams, and then recombine them into one unitary data structure (e.g., file).

Stagger-cast Variants

It will be recognized that the apparatus and methods of the present invention can also be used to afford other benefits, including increased robustness and even a "near data-on-demand" (NDOD) capability. Specifically, in one embodiment, requested (or otherwise transmitted) data is "stagger-cast" for a period of time such that time-shifted copies of a given data file or the like are transmitted over one or more QAMs allocated to the session request issued by a given CPE. The term "stagger-cast" as used in the present context refers to a process wherein identical copies of the same data, with their start times staggered by some duration, are multiplexed with each other to form a transport stream.

When a user tunes to the transport stream, the user can start downloading the data from the beginning as soon as the start of a next staggered copy of the data is received. This results in an OD-like functionality for the same data without having to establish a new session (and allocate a new dedicated channel). Hence, whereas one prior embodiment of the invention described herein would instantiate a new session, channel and transport stream based on each separate request received by the server (or other servicing entity) from different CPE within the network, the "stagger-cast" approach allows the second and subsequent users to be directed to an already existing QAM (or set of QAMs) to access one of the stagger-cast copies of the data file(s).

The level of latency (i.e., how "near" the NDOD really is to true DOD for these second and subsequent users) can be set as granular as desired, this parameter being determined by the metrics of the time delay and multiplexing process.

Similarly, the total duration of the staggered data transmissions (i.e., from the beginning of the first copy to the end of the last copy) can be controlled as desired so as not to monopolize too much bandwidth; e.g., to permit the established session to be torn down without too much delay. A window can be established (e.g., from the beginning of the first copy to the beginning of the last copy within the TS) such that any second and subsequent users requesting the download can either be serviced by the first or subsequent copy of the data if inside the window, or alternatively instantiate a new session (and QAM(s)) if they are outside the window.

Hence, in one variant, the NDOD or stagger-cast data service provided to a user within a given local service area or node can be instigated based on a download (and session) request from that user. When the first user's session is established, and one or more QAMs allocated as previously described herein, the TS broadcast onto the allocated QAM(s) can comprise a plurality of stagger-cast copies of the requested data. As other users within the same service area/node request the same data download thereafter, they can access the beginning of the transmitted data file by waiting for one or more stagger or latency periods.

Situations where this stagger-cast functionality may be useful include, e.g., where bandwidth available within a given local service node is extremely limited (i.e., the MSO does not want to penalize or rob bandwidth from potential VOD or other premium service users to service multiple data download requests, and the effective bandwidth utilized by the stagger-cast mode is less than that used by separate sessions). Another situation might comprise where multiple users within a local service area are expected to download the same data in a substantially simultaneous fashion, such as where multiple people in the same area will be playing a given (multi-user) game requiring the same files, or requiring an application to perform some sort of function in relation to a program broadcast into that specific area, or the like.

Conversely, the MSO can constrain users to accessing the high-speed data download capability of the invention to only certain windows of time (for given files), these windows corresponding to the aforementioned windows for staggered access. That way, user data demands for the same data are "funneled" to a window where the minimum of bandwidth (or at least the minimum number of different QAMs and sessions) are required to service the requests.

Similarly, the "pause" functionality previously described herein can be effected for at least a period of time by simply accessing the next successive packet in a latent copy of the file, such packet being a counterpart to the next successive packet in the file copy after that from where the pause was initiated. The user's CPE 106 (including any applications running thereon accessing the data download function) can be programmed if desired to determine the maximum allowable latency for the pause, and terminate the pause no later than this time in order to guarantee that all packets of the requested file will at least be received.

The aforementioned staggered approach may also be used to increase download robustness, and obviate the retransmission processes previously described. For example, in one variant, the user's CPE 106 receives the data (e.g. in the form of the MPEG packets) and evaluates them for integrity, such as via a CRC. If the packets are corrupted, instead of issuing an upstream retransmission request, the CPE 106 can simply access the required packets within the next copy of the file that is present within the TS. The CRC or other evaluation process can be completed in a sufficiently short time so as to permit the CPE to grab one or more subsequent copies of the corrupted packets. Various TS multiplexing schemes well known in the art (e.g., those used within conventional "stagger-cast" applications) can be used to provide the desired data properties.

The provision of staggered file transmissions within a given session can also be driven by other considerations such as, e.g., available bandwidth at the relevant local node, or the network as a whole. For example, an MSO might only allow stagger-casting of data where (i) there is a sufficient expectation of multiple different users downloading the same file at roughly the same time, and/or (ii) where remaining bandwidth so dictates. Hence, the decision to implement stagger-casting of data (or for that matter any other functionality described herein) can be driven by a higher level process such as a "rules engine" design to impose business-related and/or operational rules on the system. One exemplary rules engine compatible with the present invention is described in detail (in the context of an SD/HD bandwidth allocation system) in U.S. patent application Ser. No. 10/881,979 filed Jun. 29, 2004 and entitled "METHOD AND APPARATUS FOR NETWORK BANDWIDTH ALLOCATION" incorporated herein by reference in its entirety.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

APPENDIX I

® Copyright 2004 Time Warner Cable, Inc. All Rights Reserved

| Field Name | # of Bits | Value | Notes |
|---|---|---|---|
| Private_section( ) { | | | |
|     table_id | 8 | 0x40 | User private |
|     section_syntax_indicator | 1 | 0b | A value of 0b indicates the private_data_bytes immediately follow the private_section_length field. |
|     private_indicator | 1 | 0b | User definable |
|     reserved | 2 | 11b | |
|     private_section_length | 12 | | Specifies the number of remaining bytes in the private section immediately following the private_section_length field. The value in this field shall not exceed 4093 (0XFFD). |
| if (section_syntax_indicator) == '0') { | | | |
| for (i=0; i<N; i++) { | | | |
|     table_id_extension | 16 | | The table_id_extension contains a multiplier value to be used in error recovery. By using this multiplier value along with a requested section_number, the client will be able to calculate an NPT for retransmission of a stream at a specific section_number. |
|     reserved | 2 | 11b | |
|     version_number | 5 | 00000b | |
|     current_next_indicator | 1 | 1b | This field is set to 1b indicating the information in the private_section is always current. |
|     section_number | 32 | | This value starts at 0 with the first section and shall be incremented by 1 with each additional section in this private table. This field has been modified from the generic section syntax to 32 bits in order to handle larger data file sizes. |
|     last_section_number | 32 | | The number of the last section of the private table of which this section is a part. This field has been modified from the generic section syntax to 32 bits in order to handle larger data file sizes. (maximum data file size of 4 GB) |
| for (i=0; i<private section length-11; i++) { | | | |
|     private_data_byte | 8 | | The data file will be located at this field in 4078 byte segments. |
|     } | | | |
|     CRC_32 | 32 | | 32 bit CRC field |
|     } | | | |
| } | | | |
| } | | | End of private_section |

APPENDIX II

® Copyright 2004 Time Warner Cable, Inc. All Rights Reserved

| Link Type | Meaning | How Used |
|---|---|---|
| 0x00 | Reserved | Reserved |
| 0x01 | Service Tune Link Type | Main Menu catalogs, OnDemand Service catalogs, Network Express catalogs |
| 0x02 | OnDemand Selection Catalog Link Type | Main Menu catalogs, OnDemand Service catalogs, Network Express catalogs |
| 0x03 | OnDemand Menu3 Catalog Link Type | Main Menu catalogs, OnDemand Service catalogs, Network Express catalogs |
| 0x04 | Index Catalog Link Type | Alpha & Theme Menu catalogs |
| 0x05 | Index2 Catalog Link Type | Alpha & Theme Menu3 catalogs |
| 0x06 | Genre Collection Catalog Link Type (client-side synthetic) | Main Menu catalogs |
| 0x07 | Purchase List Catalog Link Type (client-side synthetic) | OnDemand Service catalogs |
| 0x08 | Make Favorite Link Type (client-side synthetic) | Network Express catalogs |
| 0x09 | Preview Selection Catalog Link Type | Main Menu catalogs |
| 0x0A | Service Launch Link Type | Network Express catalogs |
| 0x0B | Exit Menu Link Type | Network Express catalogs |
| 0x0C | Network Express Link Type (client-side synthetic) | Network Express catalogs |
| 0x0D | Record Link Type (client-side synthetic) | Network Express catalogs |
| 0x0E | NDVR Lookback Link Type (client-side synthetic) | Network Express catalogs (Compass only) |
| 0x0E-0x0F | Reserved | Reserved |

APPENDIX III

® Copyright 2004 Time Warner Cable, Inc. All Rights Reserved

| OnDemand Selection Catalog Offering Types | |
|---|---|
| OfferingType Value | Meaning |
| 0x00 | Reserved |
| 0x01 | Free. No charge for this offering type. |
| 0x02 | Per Use. A charge is applied each time this offering is used. |
| 0x03 | Subscription. A monthly charge is applied for unlimited offering usage. |
| 0x04-0xFF | Reserved |

APPENDIX IV

® Copyright 2004 Time Warner Cable, Inc. All Rights Reserved

OnDemand Selection Catalog Selection Types

| Value | Meaning |
|---|---|
| 0x00 | Reserved |
| 0x01 | OnDemand VOD/SVOD Selection. This is the typical OnDemand VOD/SVOD selection type. It uses rec_AssetNameRef to establish the session. Example: the client may allow the user to "buy" or "preview trailer" selections of this type. |
| 0x02 | Service Selection. This selection refers to a service selection. If selected, the service specified by rec_ServiceID is invoked. Example: the client may tune to a service specified by this selection. This could be a network boadcast service or perhaps a barker channel showing movie previews. |
| 0x03 | AssetName Auto-play Selection. When selected, this selection type is used to automatically play an asset, specified by rec_AssetNameRef. Example: the client may automatically play this selection without providing the user with choices. |
| 0x04 | AssetID Auto-play Selection. When selected, this selection type is used to automatically play an asset, specified by rec_AssetID. Example: the client may allow the user to "play" or "reserve" selections of this type. |
| 0x05 | Help Text Selection. When selected, these selection types display text instead of establishing a session. Example: the client may simply display the rec_DescriptionRef when selected. |
| 0x06 | AssetID Reserve Selection. This type is use to refer to a selection that represents a reservation of an NPVR show, specified by rec_AssetID. The client may allow the user to "play" or "remove reserve" selections of this type. |
| 0x07 | AssetID Season Pass Reserve Selection. This type is use to refer to a selection that represents a season pass reservation of an NPVR show, specified by rec_AssetID. The client may allow the user to "play" or "remove reserve" or "remove season pass" selections of this type. |
| 0x08 | AssetID Mystro Suggested Reserve Selection. This type is use to refer to a selection that represents a Mystro-suggested reservation of an NPVR show, specified by rec_AssetID. The client may allow the user to "play" or "remove reserve" or "tell Mystro good suggestion" or "tell Mystro bad suggestion" selections of this type. |
| 0x09 | AssetName OnDemand Resume Selection. This selection entry is used to denote an OnDemand purchase that is within the viewing window. |

-continued

OnDemand Selection Catalog Selection Types

| Value | Meaning |
|---|---|
| 0x0A | Season Pass Root Item.<br>This is used in the Reserve Shows catalog to denote a higher level season pass entry. This entry does not point to a specific asset ID or asset name, and instead is use to consolidate settings related to a viewer's season pass. |
| 0x0B | OfferingID Auto-Play Selection<br>When selected, this selection type is used to automatically play an asset, specified by rec_OfferingID. The client may automatically play this selection without providing the user with choices. |
| 0x0C | OfferingID OnDemand VOD/SVOD Selection.<br>This is the typical OnDemand VOD/SVOD selection type. It uses rec_OfferingID to establish the session. If the Event flags denote that a Preview is available then the rec_OfferingID may be used with the 'preview' Boolean set to true. |
| 0x0D | OfferingID OnDemand Resume Selection.<br>This selection entry is used to denote an OnDemand purchase that is within the viewing window. |
| 0x0E | Data Download Asset Type<br>This title refers to an applications ability to download a data file using the session protocol and the Data Encoding Spec. Unless the application knows how to download a data file using an InBand session, this type of title can be ignored. |
| 0x0F-<br>0xFF | Reserved |

APPENDIX V

® Copyright 2004 Time Warner Cable, Inc. All Rights Reserved [25]

| Spec | Metadata Name | Description | Type | Required vs Optional |
|---|---|---|---|---|
| AMS | Provider | A unique identifier for the provider of the Asset | String - ex. "Zodiac" | Req |
| AMS | Product | An identifier for the product offering | String (Max 20 Chars) | Req |
| AMS | Asset_Name | A string containing the identifying name of the asset. Asset names must be unique within a product. | String (Max 50 Chars) | Req |
| AMS | Version_Major | An integer representing the major version number. | Integer | Req |
| AMS | Version_Minor | An integer representing the minor version number. | Integer | Req |
| AMS | Description | A human-readable string describing the Asset. | String | Req |
| AMS | Creation_Date | A string representing the date on which the Asset was created. | String - "yyyy-mm-dd" | Req |
| AMS | Provider_ID | A unique identifier for the provider of the asset. The Provider_ID must be set to a registered internet domain name restricted to at most 20 characters. For example, CableLabs is "cablelabs-films.com" (19 chars). | String - Ex. "indemand.com" | Req |
| AMS | Asset_Class | A system-level type for the asset. This is intended to be helpful for the application mapping and routing, and is expected to be more general than the Type value for the content. Expected value is "data". | String | Req |
| AMS | Verb | A string containing an action to be performed on the asset. The only valid values for the Verb are the empty string (""), and "DELETE". | String | Opt |
| MOD or SVOD | Rating | MPAA or TV Rating. (See Annex A, Ratings and Advisories) | String, one rating per element. | Req |
| MOD or SVOD | MSORating | MSO applied rating for content not otherwise rated. (See Annex A for examples) | String, one rating per element. | Opt |
| MOD or SVOD | Run_Time | Run time for this data download. This value is determined based on how long it would take to play the data MPEG file at the standard VOD rate of 3.75 Mbps. | String - "hh:mm:ss" | Req |

-continued

| Spec | Metadata Name | Description | Type | Required vs Optional |
|---|---|---|---|---|
| MOD or SVOD | Type | The asset type that determines how and where it is stored in the system. Value is expected to be "data_mpeg" or "data_raw". If the type is "data_raw" then the ingest device must convert the data file into an MPEG file complaint with the Data Encoding Spec. | "data_mpeg" or "data_raw" | Req |
| MOD or SVOD | Content_FileSize | File Size (in bytes) of the included content for Quality Assurance & processing. | Integer - unsigned 64-bit value | Req |
| MOD or SVOD | Content_CheckSum | A string containing a hex number representing a MD5 (RFC 1321) message digest value for Quality Assurance. | String - Hex (32 Chars) | Req |
| MOD or SVOD | Encryption | A "Y" or "N" flag indicating whether or not encryption is required | String - "Y" or "N" | Opt |
| MOD or SVOD | Copy_Protection | A "Y" or "N" flag indicating whether or not copy protection is required. If "Y" then Encryption must be used. | String - "Y" or "N" | Opt |
| MOD or SVOD | Analog_Protection_System | An integer representing the value of APS. 0 - Analog protection off 1 - AGC process on, split burst off 2 - AGC process on, 2-line split burst on 3 - AGC process on, 4-line split burst on | Integer - values 0-3 | Optional Required if Copy_Protection is asserted |
| MOD or SVOD | Encryption_Mode_Indicator | An integer representing the value of EMI. 0 - Copying is permitted 1 - No further copying is permitted 2 - One generation copy is permitted 3 - Copying is prohibited | Integer - values 0-3 | Optional Required if Copy_Protection is asserted |
| MOD or SVOD | Constrained_Image_Trigger | An integer representing the value of CIT. 0 - No image constraint asserted 1 - Image constraint required | Integer - value 0 or 1 | Optional Required if Copy_Protection is asserted |
| MOD or SVOD | CGMS_A | An integer representing the value of the Copy Generation Management System (Analog). 0 - Copying is permitted without restriction 1 - No further copying permitted 2 - One generation of copies may be made 3 - No copying is permitted | Integer - values 0-3 | Optional Required if Copy_Protection is asserted |

What is claimed is:

1. A consumer premises equipment (CPE) adapted for use in a content distribution network, said CPE comprising:
 a processor; and
 at least one computer program operative to run on said processor, said computer program comprising a plurality of instructions which are configured to, when executed, cause said CPE to:
  initiate a session request upstream to a remote network entity for at least one non-content related data structure;
  receive information from said network to establish said session on a dedicated communication channel;
  receive said at least one non-content related data structure over said dedicated communication channel via said session, said at least one non-content related data structure comprising raw data converted to at least one packet stream and descriptive metadata configured to describe said raw data for transmission to said CPE;
  extract said at least one packet stream based at least on a program identifier (PID) thereof;
  terminate said session upon receipt of an indicator configured to indicate receipt of all of said packet stream and said descriptive metadata; and
  reassemble said extracted packet stream using said descriptive metadata into said at least one non-content related data structure, said reassembly being triggered in part on said indicator;
  wherein said at least one reassembled non-content related data structure is executable by said CPE without a second session required to be established with an on-demand server.

2. The CPE of claim 1, wherein said establishment of said session on said dedicated communication channel comprises establishment of a session using protocols similar to on-demand protocols resident within an on-demand computer program of said CPE.

3. The CPE of claim 1, wherein said at least one non-content related data structure comprises one or more binary executable files.

4. The CPE of claim 1, wherein said plurality of instructions are further configured to, when executed, cause said CPE to:
perform a check of at least portions of said received non-content related data structure;
determine whether errors exist within said received non-content related data structure based at least in part on said check; and
request a corrective action from a remote network entity.

5. The CPE of claim 4, wherein said check comprises a cyclic redundancy check (CRC) function, and said corrective action comprises a retransmission of at least portions of said non-content related data structure.

6. The CPE of claim 1, wherein said plurality of instructions are further configured to, when executed, cause said CPE to, generate and transmit a pause command to a network entity to initiate a pause of transmission of said non-content related data structure.

7. The CPE of claim 6, wherein said plurality of instructions are further configured to, when executed, cause said CPE to, issue, after said pause command, a request to resume said transmission of said non-content related data structure, said request to resume also comprising a lightweight signaling protocol.

8. The CPE of claim 7, wherein said request is issued in response to a signal received from an application running on said CPE receiving said non-content related data.

9. The CPE of claim 1, wherein said at least one dedicated communication channel comprises a channel which would otherwise be allocated to a Video on Demand (VOD) session request.

10. A method for distributing content on a network comprising:
initiating a session request to a remote upstream network entity, said request comprising a request for at least one data structure, said data structure being unrelated to content;
receiving information from said network, said information being used for establishing said session via a dedicated communication channel;
receiving said at least one data structure over said dedicated communication channel via said session, said at least one data structure comprising raw data converted to at least one packet stream and data descriptive of said raw data for transmission to a consumer premises equipment (CPE);
extracting said at least one packet stream based at least on an identifier thereof;
upon receipt of an indicator configured to indicate receipt of an entirety of said packet stream and said descriptive data, terminating said session;
reassembling said extracted packet stream into said at least one data structure using said descriptive data, said act of reassembling being triggered in part by said indicator; and
executing said at least one reassembled data structure by said CPE, said act of executing occurring without requiring a second session to be established with an on-demand server.

11. The method of claim 10, wherein said descriptive data comprises a metadata file, and said packet stream comprises a Moving Pictures Experts Group (MPEG) based packet stream.

12. The method of claim 10, wherein said at least data structure comprises one or more binary executable files.

13. The method of claim 10, further comprising enabling a user of said CPE to select said descriptive data.

14. The method of claim 13, wherein said act of enabling said user to select said descriptive data comprises providing a catalog to said user, said catalog comprising a selectable list of at least information contained in said descriptive data.

15. A method for distributing content on a network, said method comprising:
receiving a request to instantiate a session for delivery of at least one non-content related data structure to a requesting CPE;
transmitting information to said requesting CPE, said information configured to enable said requesting CPE to establish said session via a dedicated communication channel;
transmitting said at least one non-content related data structure over said dedicated communication channel to said requesting CPE via said session, said at least one non-content related data structure comprising: (i) raw data converted to at least one packet stream, and (ii) descriptive metadata describing said raw data;
extracting said at least one packet stream using at least one program identification (PID) value thereof; and
transmitting an indicator to said requesting CPE, said indicator configured to indicate delivery of an entirety of said packet stream and said descriptive metadata to said requesting CPE;
wherein said requesting CPE is configured to upon receipt of said indicator:
terminate said session;
reassemble said extracted packet stream into said at least one non-content related data structure using said descriptive metadata; and
execute said at least one reassembled non-content related data structure without requiring a second session to be established with an on-demand server.

16. The method of claim 15, wherein said act of transmitting said at least one non-content related data structure occurs only during prescribed periods of time.

17. The method of claim 16, wherein said prescribed periods of time are selected based at least in part on bandwidth considerations relating to said network.

18. The method of claim 15, wherein said packet stream comprises a Moving Pictures Experts Group (MPEG) based packet stream.

19. The method of claim 15, wherein said at least one non-content related data structure comprises a gaming-related data structure.

20. The method of claim 15, wherein act of transmitting said raw data to said CPE comprises utilizing an amount of bandwidth greater than a baseline bandwidth generally available for on-demand content downloads from said on-demand server.

* * * * *